(12) United States Patent
Grand

(10) Patent No.: US 6,446,055 B1
(45) Date of Patent: Sep. 3, 2002

(54) PROCESS CONTROL

(76) Inventor: Stephen L. Grand, The Old Station House, Haybridge, Wells, Somerset BA5 1AQ (GB)

(*) Notice: Subject to any disclaimer, the term of this patent is extended or adjusted under 35 U.S.C. 154(b) by 0 days.

(21) Appl. No.: 09/284,079
(22) PCT Filed: Nov. 5, 1996
(86) PCT No.: PCT/GB96/02703
§ 371 (c)(1),
(2), (4) Date: Apr. 7, 1999
(87) PCT Pub. No.: WO98/20418
PCT Pub. Date: May 14, 1998

(51) Int. Cl.$^7$ ................................................ G06N 3/12
(52) U.S. Cl. .............................. 706/10; 706/21; 706/47
(58) Field of Search ............................. 706/10, 21, 47, 706/61; 422/67

(56) References Cited

PUBLICATIONS

Ortega, C.; Tyrrell, A., Evolvable hardware for fault–tolerant applications, Evolvable Hardware Systems (Digest No. 1998/233), IEE Half–day Cooloquium on, Mar. 3, 1998, pp.:4/1–4/5.*
Pashkevich. A.P.; Pashkevich, M.A., Multiobjective optimisation of robot location in a workcell using genetic algorithms, Control '98. UKACC International Conference on (Conf. Publ. No. 455), vol.: 1, Sep. 1–4, 1998, pp. 757–762, vol. 1.*
Chao–Hsien Chu; Chang–Chun Tsai, A heuristic genetic algorithm for grouping manufacturing cells, Evolutionary Computation, 2001. Proceedings of the 2001 Congress on, vol.:1, May 27–30, 2001, pp. 310–317.*
Schnecke, V.; Vornberger, O., Hybrid genetic algorithms for constrained placement problems, Evolutionary Computation, IEEE Transactions on, vol.:1 Issue: 4, Nov. 1997, pp. 266–277.*
Jin–Tai Yan, A simple yet effective genetic approach for the orientation assignment on cell–based layout, VLSI Design, 1996. Proceedings., Ninth International Conference on, Jan. 3–6, 1996, pp. 33–36.*
Jin–Tai Yan, Genetic–based rotation assignment in macro cell layout, Circuits and Systems, 1995., Proceedings., Proceedings of the 38th Midwest Symposium on, vol.:1, Aug. 13–16, 1995, pp. 330–333, vol. 1.*
Schwan et al, "'Topologies' —Distributed Objects on Multicomputers", *ACM Transactions on Computer Systems*, vol. 8, No. 2, May 1, 1990, pp. 111–157.
Minoura et al, "Structural Active Object Systems for Simulation", *ACM Sigplan Notices*, vol. 28, No. 10, Oct. 1, 1993, pp. 338–355.

* cited by examiner

Primary Examiner—Wilbert L. Starks, Jr.
(74) Attorney, Agent, or Firm—Nixon & Vanderhye P.C.

(57) ABSTRACT

A process control system is described using a plurality of autonomous process cells. Each process cell has data inputs, data outputs, processing logic, state variable, and link data specifying the other cells that provides its inputs. A scheduler triggers the plurality of cells as a whole to update their state. Cell may be recursive and contain child cells, at least some of which are linked to the parent cell. The cells can be subject to mutation and a non-brittle program language is provided for the logic within the cells in order to stop mutation causing a cell to cease to function. Cells within a neural network are provided with both fast and slow feedback mechanisms to improve their responsiveness to action reinforcement cycles. A mediated peer-to-peer network is described for use to simulate a tessellated virtual environment.

16 Claims, 8 Drawing Sheets

PROCESS CONTROL

BACKGROUND OF THE INVENTION

1. Field of the Invention

This invention relates to process control. More particularly, this invention relates to process control in Systems within which the process control is broken down into a plurality of discrete entities that cooperate together to yield the overall function.

2. Discussion of Prior Art

It is known in Object Oriented Programming (OOP) techniques to sub-divide a computer program into program objects. These program objects then interact with one another to provide the desired functionality. Computer hardware operating under control of such software can be considered as a process control apparatus responsive to various input signals (e.g. keystrokes) to perform a process thereupon to yield output signals (e.g. signals controlling the operation of a machine or driving a display device).

The program objects within OOP systems are designed to have a fixed data input interface, a fixed dam output interface and be responsive to fixed program calls whilst masking other aspects of their form and operation from the other objects in the system. Such techniques have considerably improved the ability to re-use computer program code between different systems and have simplified maintenance, de-bugging and other issues involved in computer program development.

Within OOP systems it is known to operate such that objects issue calls to other objects passing data of a pre-defined format to the object being called. The called object then performs a processing operation upon the data passed to it before issuing its outputs and passing control to another object. With this top down approach it is necessary that an object that will issue a call to another object is preconfigured such that the data that needs to be passed to the called object is predefined and the function that will be triggered is integrated with functions that are being performed by the calling object. The top down approach has the result that considerable work it required when new objects are added to the system to modify existing objects to use those new objects. Furthermore, OOP systems need to be developed to co-ordinate the activities of all of the objects within the system and with careful design of the flow of control between objects. OOP systems are not well suited to adaptive/genetic programs techniques.

Another known programming technique that may be used to control the processes performed using a computer is that of neural networks. Neural networks use a model of layers of interconnected nodes exchanging weighted signals with the weighting for signals passing between nodes being modulated by a feedback mechanism. Whilst such neural networks provide a degree of self adaptation to the tasks being performed, they again rely on a top down control approach to the connections between nodes and the scheduling of the signal exchanges between nodes. Once a neural network has been established it is difficult to change its configuration.

SUMMARY OF THE INVENTION

Viewed from one aspect the invention provides a process control apparatus comprising:

a plurality of process cells, each process cell including at least one data input, at least one state variable, programmable logic for updating said at least one state variable in dependence upon said at least one data input, at least one data output for outputting data dependent upon said at least one state variable and a programmable link for each said data input specifying a source from which said at least one data input receives data; and a scheduler for triggering said plurality of process cells as a whole to update their state variables whereby each of said plurality of process cells autonomously updates its state variables in dependence upon its at least one data input using its programmable logic to generate its at least one data output, wherein at least one of said plurality of process cells comprises a parent process cell that contains at least one child process cell, at least one of which child process cells having at least one of a data input of said child process cell connected to a data input of said parent process cell and a data output of said child process cell connected to a data output of said parent process cell.

The invention breaks down the process to be performed into a plurality of process cells. Each of these process cells is self contained in that it fully specifies its inputs, outputs, state variables and processing logic as well as specifying the links indicating the sources for each of its inputs. Providing the process cells with the above features enables them to act autonomously to update their variables without requiring outside control. This greatly eases that task of modifying or enlarging the system by adding further process cells since the existing process cells need not be modified. Furthermore, since the links are embedded within the process cells there is no predefined flow of control requiring modification as the system is adapted. The process cells as a whole merely need triggering to update themselves and thereafter can act autonomously without any higher level control until they are all updated.

Avoiding the need for an overall management level within the system that coordinates the action of all of the process cells considerably simplifies the development and modification of the system. Furthermore, as systems increase in the number of process cells they contain, the approach of the invention assists in reducing the normally exponential increase in complexity that is associated with such growth since modifications are localised to only the new process cells and those existing process cells that may want to receive inputs from the new process cells rather than extending through the entire system.

The autonomous nature of the process cells is enhanced by providing for parent process cells that contain child process cells. The child process cells within the parent process cell allow the functionality that must be provided by the parent cell to be split between the child process cells and also allows the co-operative and adaptive way in which child process cells interact to be exploited in providing the functionality required of the parent process cell. The parent process cell together with its child process cells may also be moved as a single entity between systems.

The invention is particularly suitable for use in embodiments in which one or more of said process cells are mutable process cells that, during operation, mutate so as to change one or more of said at least one data input, said at least one state variable, said programmable logic, said at least one data output and said programmable link.

The provision of mutable process cells that are able to randomly modify themselves would normally be an anathema to the designers of such systems. Mutation of objects within an OOP system would normally be viewed as corruption of the program and would cause great problems.

However, since the process cells of the present invention are highly autonomous, mutation within the process cells has a much more localised effect and can be considered a positive advantage in adaptive systems.

In order to assist in the robustness of the system to cope with mutation, it is preferred that said mutable process cells include programmable logic controlled by a sequence of program instruction words of an instruction set, said instruction set having opcode words identifying operations to be performed and operand words identifying variables to be manipulated in said operations, each opcode word having a default value if parsing of said sequence of program instruction words requires that said opcode word is interpreted as an operand word and each operand word having a default action if parsing of said sequence of program instruction words does not specify an opcode word using said operand word, whereby mutation of said sequence of program instruction words does not render said logic inoperative.

Providing the programmable logic within the mutable process cells to have the above characteristics ensures that the process cells remain operative whatever mutation occurs within their logic. It will be appreciated that the operand words May specify constants as well as true variables.

The source of the data inputs for each process cell may be the data output of another process cell. This is the case for the majority of such data inputs. However, there are circumstances in which it is highly desirable that a source of a data input should be an extra-cellular state variable shared by a plurality of process cells.

Such extra-cellular state variables provide a diffuse feedback mechanism for controlling process cell behaviour across a plurality of process cells. This feature combined with the mutable nature of process cells is strongly advantageous in modulating the development of adaptive systems. The extra-cellular state variables can provide feedback as to how well the entire system is achieving its overall desired results without having to be targeted to specific process cells within the overall system.

In order to improve the flexibility of the development of systems it is preferred that said logic comprises one of compiled program instruction words, interpreted program instruction words and a program call to a routine defined outside of a process cell.

Whilst it will be appreciated that the process cells and scheduler operating on a general purpose computer can provide a process control apparatus having a great variety of possible uses, the present invention is particularly suited for use in the simulation of physical systems and in providing neural networks. When simulating physical systems the process cells may be made to correspond to physical elements of the system being simulated. In the circumstances, the data output from a physical element may merely be output that is directed towards a system that is used to visualise the simulation. The ability to readily add process cells to a system allows the simulation to be grown without having to consider the effect other than in the local area of the new process cells and also provides the ability to add process cells whilst a simulation is actually running. The self contained nature of the process cells that facilitates adaption of the process cells (e.g. through mutation) renders this technique particularly suitable for neural networks that are specifically intended to adapt themselves in use.

Improved adaptive performance is achieved by embodiments in which within a process cell said programmable logic multiplies data received at a data input by a weighting coefficient having a rest value, said weighting coefficient being modulated by modulating data received at other data inputs of said process cell to provide a fast feedback mechanism whereby said weighting coefficient is changed by said modulating data and then relaxes towards said rest value in accordance with a first time constant and a slow feedback mechanism whereby said rest value relaxes towards said weighting coefficient in accordance with a second time constant, said second time constant being treater than said first time constant.

The above techniques are particularly suited for operating to simulate a tessellated virtual environment using a plurality of client computers and a server computer, wherein each client computer contains those process cells relevant to a region currently being simulated by said client computer and client computers within a region interacting via peer-to peer communication, said server serving to pass identification data to and maintain in those client computers, said identification data serving to identify the client computers within said environment to enable peer-to-peer communication therebetween as client computers move between different regions of said tessellated virtual environment.

Viewed from another aspect the invention provides a process control method for controlling a plurality of process cells, each process cell including at least one data input, at least one state variable, programmable logic for updating said at least one state variable in dependence upon said at least one data input, at least one data output for outputting data dependent upon said at least one state variable and a programmable link for each said data input specifying a source from which said at least one data input receives data, said method comprising the step of:

triggering said plurality of process cells as a whole to update their state variables whereby each of said plurality of process cells autonomously updates its state variables in dependence upon its at least one data input using its programmable logic to generate its at least one data output, wherein at least one of said plurality of process cells comprises a parent process cell that contains at least one child process cell, at least one of which child process cells having at least one of a data input of said child process cell connected to a data input of said parent process cell and a data output of said child process cell connected to a data output of said parent process cell.

BRIEF DESCRIPTION OF THE DRAWINGS

An embodiment of the invention will now be described, by way of example only, with reference to the accompanying drawings in which.

DETAILED DISCUSSION OF EMBODIMENTS

General Overview

Figure 1:
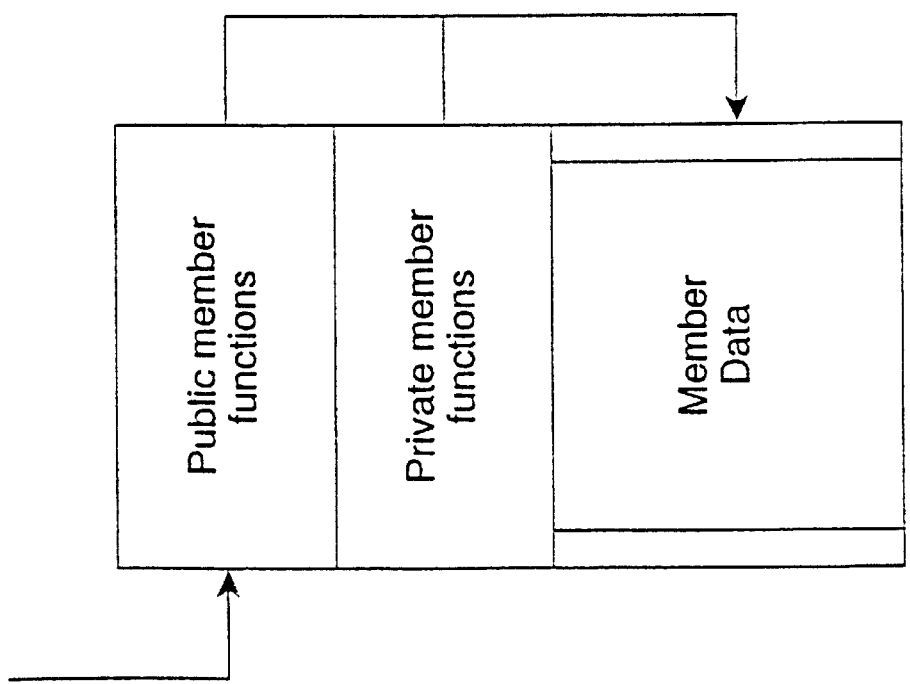
FIG. 1 illustrates an OOPS object.

The invention will be described in terms of a general purpose computer operating in accordance with an architecture termed "Gaia" to provide a process control apparatus.

Gaia is an autonomous-object modelling system for virtual reality and 3D entertainment applications. It is also a general modelling architecture for research and development in distributed computation and artificial life technologies.

Technical Overview

Gaia is fundamentally a software architecture; that is to say, a definition of a data structure for encapsulating modelled objects so that any such object may communicate with any other, without prior knowledge of that object's function or existence.

Surrounding the data structure (which is called a "cell" (process cell), to associate it with a fundamental building block of living systems) is a body of code which handles inter-cellular and intra-cellular communication (again using biological metaphors), task scheduling, 3D geometry and rendering, distributed processing and other support functions.

Gaia provides mechanisms for the representation of, and interaction between virtual objects in a virtual world. Each virtual object is a cell, and therefore presents a unified appearance to all other cells in a simulation. Cells are recursive entities, and so can contain arrays or networks of other cells (parent process cells contain child process cells). The base cell structure is highly scalable, and a simulation can therefore represent cells as small as a neurone in a neural net, or as large as the virtual universe itself.

The cell and its communication interfaces represent a biological modelling system, and are therefore well suited to the construction of artificial life-forms, and other biologically inspired adaptive systems such as neural networks and genetic algorithms. The biological metaphor carries over to the modelling of non-living objects, for example by using biochemical analogies for the modelling of diffuse feedback loops or complex, non-linear expressions.

Gaia is an "agent-oriented" programming system, in that each cell object is totally autonomous and handles its own data-gathering (sensory systems) and state functions. The main program loop (scheduler) simply has to allow each object in the system to update itself; it doesn't need to know what any of those objects are for or how they are to behave.

Example Advantages

Gaia provides a powerful 3D modelling and simulation environment for stand-alone and online games, serious simulations and research. It has the following key features:

As conventional programs get more and more complex, their cost, development time and bug rate grow exponentially. Autonomous objects are a powerful way to flatten the complexity curve and produce systems whose complexity grows more or less arithmetically. This allows the creation of much larger and more sophisticated simulations than has been possible up until now.

Gaia's approach to modelling allows for the construction of substantially more subtle and rich virtual worlds than at present. It is particularly well suited to the simulation of artificial life-forms, either as non-player characters and menial creatures or as intelligent computer adversaries.

Because new virtual objects can be added to an existing simulation without prior specification. Gaia simulations can be developed in an "evolutionary" way, rather than requiring detailed advance specification. Projects can adapt to changing requirements and adjust to solve unforeseen problems.

Since this process of adding new objects can occur while a simulation is running, Gaia supports new entertainment possibilities and new approaches to marketing and delivery. Gaia-based games can be "virtual soap-operas", where new entertainment experiences are added to an existing came as required, while objects that are no longer relevant can be removed.

Because the virtual objects and life-forms in a Gaia simulation are autonomous, they can be re-used in different simulations. This removes much of the "re-inventing the wheel" which normally accompanies game development, and thus reduces costs and development time.

Gaia may lend itself to a novel system for inter communication across the Internet, which doesn't require large servers or high bandwidth links.

Conceptual View

Computation Equals Simulation Equals Computation

Computing is all about simulation, even if this is not how it is usually viewed.

ENIAC, one of the very first digital computers, was used to compute firing tables for the U.S. Military. This may not sound much like a simulation, but in a real, if rather limited sense, these calculations were simulations of the motion of projectiles. By mathematically simulating motion in free-fall, ENIAC could produce tables for deciding the correct muzzle angle for a gun, given a target distance and wind direction etc. Very often, computers are used to simulate things in this way, in order to predict their future behaviour. When an accountant prepares a business model spreadsheet, he is using the computer to simulate the behaviour of the business itself, in order to predict its future performance.

Sometimes simulations are simply mirrors of historical change. A spreadsheet Profit and Loss Account simulates the historical flow of money and value into and out of a business. Even the most humble business application of computers, the Payroll calculation, is, in some sense, a simulation of the manual process of keeping time-sheets and paying employees by the day.

More recently, computer simulation has been used as a medium of expression, "windows", "icons", "menus" and "pointers" are physical metaphors which help to make computing more tangible for people. A word processor is a simulation of paper and pen; disk operating systems are often more than nominal models of physical folders and files.

There is a trend towards the use of computer simulations almost as an end in themselves. The modelling power of modern computers can generate simulations that are tantamount to alternative realities. Computer games are heavy users of this kind of simulation, where the objective is to provide a vehicle for escapism—a way for people to forget the physical world and explore new and often more exciting virtual worlds.

Finally, there are some things that can only be achieved by simulation. For example, there is only one kind of system on this planet which exhibits intelligence, and that is life. Rocks are not intelligent, rivers are not intelligent, computers are not intelligent; only assemblies of biological cells are intelligent. For many years, people have ignored this significant fact and tried to develop artificially intelligent systems without any attempt to adapt for a computational basis the only known source of natural intelligence—Life. Artificial intelligence systems will be improved by constructing them from simulations of the key building blocks of living things.

Simulation adds a new order of processing power to computers: that there are things which cannot be computed by computers, but can be computed on machines which computers can simulate. This sounds a heretical argument, but really only says something about human beings, not computers. There are things which can be performed using a spreadsheet, which would be extremely difficult to perform using a programming language, and yet spreadsheets are written using programming languages. A programming language is a metaphor for computation, one based on the concept of "instruction-following". A spreadsheet, on the other hand, uses a different metaphor for computation: that of "cellular automata". There is nothing that a spreadsheet can do that a programming language can't, but there are things that people can do with a spreadsheet that they can't, or would find very hard to do with a programming language.

Because a computer is a "machine which can simulate machines", it is capable of simulating other kinds of computing system, besides "Von Neumann processors". Spreadsheets and neural networks are examples of the types of second-order computing device which can be constructed using a computer as a simulation machine. A particularly important aspect of this second-order concept is that a single computer can simulate very large numbers of machines at the same time. These machines can then interact with each other to exhibit behaviour and perform computations that none could accomplish alone. A spreadsheet is powerful because it is a collection of computing devices (spreadsheet cells); a neural network is powerful because it is a collection of computing devices (nerve cells).

OOPS

It is possible to view the digital computer, not as a giant calculator or a data-processing machine, but, as a machine for simulating things. In fact, as a machine for simulating machines. The theoretical foundation for digital computation was exactly this—Alan Turing's concept of a Universal Machine. Oddly, the early history of computing demonstrates a more-or-less complete disregard for this fact: the first computers were annexed by mathematicians, who treated them simply as tools through which to apply exactly the same abstract kind of thinking that they had been using for the previous three thousand years.

Since then, computing paradigms have shifted somewhat, and the modern viewpoint is "Object-Oriented Programing". In previous programing paradigms, the computer was seen as a device which followed instructions, and as a result processed data. The data were imagined as flowing into the system, being modified by the code and then flowing out again. The code was in charge of the whole operation, and the data were acted upon by the code.

FIG. 1 schematically illustrates an OOPS object.

In an Object-oriented Programming System (OOPS), the relationship between code and data has changed somewhat. Sets of related data and the code which acts on them are grouped together into unified entities called objects. Each object represents a single "thing": perhaps an employee in a payroll program, or perhaps an abstraction of some computer concept such as a display or a file. Each object contains both its "attributes" (the data representing its state) and its "properties" (the behaviour of the object, in the form of functions which alter or respond to the object's attributes). In a payroll application, an object might represent an employee. The object's attributes might be "salary", "name", "tax code", etc., while its properties might be defined as "PrintPaySlip( )", or "AdjustSalary( )".

This aggregation of code and data into objects is a very powerful idea. For a start, it is much easier to visualise a computer as a simulation system when you think of it as a "container of objects". There are also important practical advantages to OOPS, which will be discussed below. However, although to some extent object-orientation turns a computer into a "machine for simulating things", we are still some way from a true "machine for simulating collections of machines", because OOPS does not incorporate the concept of "autonomy".

Autonomy

A person is made from a colony of around one trillion ($10^{12}$) cells. They act together to create the person, but they are not being coordinated by anything. The brain is made from $10^{11}$ neurones, and out of the interactions of these cells emerges your one conscious being; yet those neurones are not being steered by anything—there is nothing inside the head, telling the brain what to do.

This is a big difference between Biology and Computing. In Procedural (old-fashioned, pre-object-oriented) computation, code cold data what to do. In OOPS, the code and data are encapsulated into objects, and those objects therefore know how to change themselves (because they 'own' the code that relates to them). However, they still need to be "told when to do it". Object-orientation does not in itself imply autonomy—in an object-oriented program, there is a controller telling the objects what to do; the objects don't control their own destiny but are controlled by a master program from above. This is largely because every class of object is different—something somewhere has to know what each object means and what you can do with it, even though it need have no knowledge of exactly how it gets done (which is the prerogative of the code in the object). There is nothing in an OOPS which solves this problem, and yet a problem it certainly is.

Disentanglement

One of the key goals behind innovation in programming techniques is to reduce entanglement in software. In the early days, programs had a structure rather similar to spaghetti: the flow of execution through a program was broken up into many threads by branching instructions ("do this if true, else do that"), but because computer memory is configured as a linear array, these threads had to be arranged in a single stream. Programs were thus extremely tangled structures, full of GOTO commands, and it was hard to write more than a few hundred lines of code without encountering errors that were almost impossible to track down, because of the mess.

Later programming paradigms such as Procedural and Modular approaches sought to disentangle code by breaking it up into more or less isolated functional units (blocks, procedures and modules). Object-orientation took this a big step further by allowing the programmer to encapsulate all the code and data referring to a single entity into a single object. It further added the concept of "data hiding", which disentangled these objects from each other by making it impossible for one object to modify another, except via a "public" member function. This substantially reduced the number of opportunities for errors caused by objects modifying each other unexpectedly. It also allowed objects to be more independent, and therefore re-useable.

Object-orientation has allowed us to build very large and complex, yet robust and maintainable software systems. However, problems remain, particularly as program complexity rises still further.

Complexity

The need for a "master program" to control and co-ordinate the actions of software objects, leads to a "top-down" approach to computing. Because the objects are not autonomous, the master program has to "understand" them and know when to tell them what to do. This very easily leads to problems such as "combinatorial explosions".

Combinatorial explosions are caused when some factor, such as the number of interactions between objects in a simulation, rises exponentially. Say an object requires five rules to describe how it should interact with each other type of object it meets: if there are two types of object, you need 20 rules: four types require 80; eight types require 320, etc.

Top-down programming, while not always as explosively complex as this, does inevitably lead to a level of difficulty for the programmer (who has to understand the system), the computer (which has to process the rules) and the user (who has to suffer the bugs) which rises very steeply as the numbers of objects and interactions increase.

In contrast, bottom-up programming methods, involving the use of autonomous objects, are a way to make very large pieces of software remain manageable. This is because no one part of the system has to encompass or be aware of the chances in all the other parts. Autonomy localises and isolates the problems of software development and flattens the complexity curve.

Mobility

OOPS allowed software objects to disentangle themselves from each other and stand alone. It is possible to take the code for a class of object out of one program and place it into another, without a "tangle of wires" caused by inter-dependencies between the class being moved and the code to which it previously belonged. However, what you can't do, is take this new class of object and place it into a program which was written without prior knowledge of the nature of this class. In other words, although OOPS allows you to remove an object without a tangle of wires, it doesn't then allow you to simply drop the new object into an existing program without having to modify the program to accept it, often substantially.

Self-governed Objects

All of these problems can be solved by making software objects truly autonomous. In other words, by allowing individual objects to detect the information they need and to determine their own state, without needing to be controlled or co-ordinated from above. The key to addressing this problem can, as before, be understood by looking to Biology.

Your body is made from around one thousand distinctly different cell types, acting together in concert. How does each cell know how to interact with all the others? The answer is, it doesn't. Not only is there no master program, controlling all these cells, but the cells themselves need no prior knowledge of each others' existence or nature. This is principally because, despite the huge variety of cell types (blood cells, liver cells, neurones, muscle cells . . . ) they are all fundamentally the same kind of structure; indeed, they all stemmed from the same parent. A human started out life as a single cell. This divided into two, then four. At each cell division, some cells switched on different genes to others, and so became differentiated from each other. After around forty such divisions, a human ends up as $2^{40}$ (approx $10^{12}$) cells, made of around a thousand distinctly different types. But because all those cells are variations of a single basic type, they all share important features, and therefore know how to communicate with each other. Blood cells are very different in function to nerve cells, but the bulk of their structure is identical. Both of them use Glucose for an energy source; both can respond to the same hormones, albeit in different ways.

In computer terms, cells are objects which, to each other, and despite their different functionality, look the same. That is, they have a unified system for communication, that allows them to interact without needing to know who they are interacting with. When a particular glandular cell is stimulated, it produces a substance, say Adrenaline. It doesn't know what that substance is used for, nor do the cells that use it know where it comes from or why it was emitted. However, the message can be understood and acted upon by recipient cells because all cells use the same system for emitting and receiving molecular messages.

A software equivalent to Biology's solution is to define objects in such a way that they can use a consistent interface (or interfaces) for communication. Normal OOPS objects have member functions for inter-object communication. A Payroll object can call the PrintPaySlip( ) function on every Employee object in turn; a Document object can call the Write( ) function on a File object to save some data to disc. However, in an OOPS system, the functions available in each class of object are different, and their meaning and detailed syntax must be known to other objects, in advance, in order that those objects can interact.

By defining a unified scheme for object interaction, we can ensure that every object can communicate with every other object (even if the recipient doesn't understand what to do with the information), without requiring prior knowledge of that object.

In addition to a unified interface (in fact because of it), we need to do away with the concept of top-down control. Each object must be master of its own destiny. Instead of objects telling other objects what to do, objects should merely chance their own state; it is up to each object to look at other objects and make its own decision how to react, if at all, to changes in them.

Autonomous software objects should to have the following properties:

1. Every object looks the same, regardless of function, to every other object and to the system. Every object can therefore communicate with ocher objects in a consistent way.
2. Every object is responsible for deciding its own actions. In general, objects do not explicitly act upon each other, but respond to each other's actions. Objects don't tell other objects what to do, they just look at other objects and decide what to do.
3. In general, objects only respond to changes in nearby objects—most interactions are localised, and no object should need to be aware of the states of more than a few other objects at a time.
4. The system itself has no responsibility for acting upon objects. All the system needs to do is allow each object in turn the chance to update itself. Instead of an arbitrary number of public member functions in an object, our autonomous objects need only one function, called "Update( )".

Biological Computation

To recap the discussion above:

Computers are fundamentally simulation machines. They can be viewed as containers of objects, rather than data-processing systems.

Simulation is an increasingly important role for computers. These simulations might be useful in their own right, as virtual worlds.

Another important use of simulation is to create "machines inside the machine" which can perform tasks which the "outer" machine cannot perform by itself. The creation of intelligent systems is one such area where the computer cannot do the job, but can simulate other machines which can.

Object-orientation encapsulates the structure and function of a software object in one place. The interfaces between such objects are, however, disparate and must be explicitly understood by the system and by other objects.

OOPS therefore does not disentangle objects sufficiently to allow them to move from application to application or computer to computer; the system needs prior knowledge of a class before it can communicate with it.

Disparate interfaces also imply a top-down programming approach which suffers from substantial complexity problems in large systems.

A solution to several of the problems of OOPS is "autonomy". In order that software objects may be autonomous, they need to present a unified interface to each other. They should not generally act upon each other but should change their own state in response to locally-gathered information about their environment. The main program loop should be responsible only for scheduling the synchronous update of each object; the system should not have to know the nature or function of any object in order to update it.

It should be, obvious by now that this chapter is meant to be a rationale for an autonomous-object programming system, geared specifically to simulation and to the construction of second-order populations of computing devices.

It should also be clear that biological organisms are seen as a powerful guide to the nature of such a system. We have seen that organisms possess the property that they act as colonies of essentially autonomous objects (cells) with no "guiding hand" to control them, and that these cells can interact because they share a unified interface for communication (and also because they are "stuck together" into multi-cellular aggregates).

It has also been mentioned that success in Artificial Intelligence requires a system for the simulation of biological building blocks. Given the importance of intelligence in future computer systems, any general-purpose simulation system should aim to be capable of modelling such building blocks.

Is there a unifying principle here? Since biological cells have themselves addressed the problems of how to create unified composite structures from massively parallel, autonomous units, can we use a biological model for defining our simulation system? Can we design it to be capable of simulating explicitly biological objects, and at the same time utilise those biological metaphors and structures for general-purpose simulation modelling?

The answer is that we can adapt the biological techniques for use on computers, not only does this help us with the above problems, but Biology offers a number of other powerful ideas which can be applied to computing. However, before we go on to examine the design for this system, we need to look more closely at the domain in which it is to operate, and the problems it seeks to solve.

Virtual Worlds and Artificial Life

The system described here has two primary aims:
1. To be a powerful biological modelling system, capable of creating intelligent systems and believable life-forms, and also capable of using biological computational approaches to the solution of problems which are intractable by conventional means.
2. To create worlds fit for those organisms and intelligences to live in—believable, rich, complex, 3D virtual environments and objects. These worlds are not only intended as stimulating environments for the evolution and education of virtual life-forms, but also as exciting and interesting places for real people to go and play.

The system is applicable to the following areas:
1. Advanced computer games, especially multi-player and Internet-supported games.
2. Real-world simulations involving multiple agents.
3. Artificial Intelligence and Adaptive Systems applications, where the simulation aspect of the system is primarily aimed at generating suitable second-order computing devices, and it is the output of those devices which is useful.
4. Research and Development into massively parallel processing, Artificial Intelligence and Artificial Life.

The system is designed to address the following key problems:

How to handle the explosive complexity of very large, multi-user simulations.
  As computer games and ocher applications expand to fill the increased computer power available for them, and especially as those programs become multi-user and distributed across the Internet, their development will become rapidly more complex and expensive. At some point, conventional approaches to software design will buckle under the load. The indications are that present-day computer games have already nearly reached that point. New paradigms will be needed to carry us up the next order of magnitude into large, multi-user, virtual reality simulations.

How to produce software which can be indefinitely upgraded and expanded by importing new virtual objects.
  Software will inevitably become more complex and costly to produce. In order to recoup the increased investment, software will have to last longer in the marketplace. One way to do this is to make it extensible, and give the user a longer-lasting experience by providing updates and new facilities through imported objects. This could be an automatic and transparent process—future games could be like FIFO buffers, being filled with new experiences at one end, while old, unwanted environments and objects drop out the other.
  Also, given longer development cycles, the more software re-use that can be obtained, the better. With the ability to swap objects arbitrarily from one environment to another, new games and other simulations can be constructed, simply by combining existing objects in new ways.
  This also increases flexibility considerably during development, since the "no prior knowledge" property allows late changes to the design without requiring major re-writes of the software.

How to enable objects to interact with each other, given no prior knowledge of their existence.
  Adding a new kind of object to a world should not require the re-programming of all the other objects, nor should there be an explosion of complexity as myriad new rules are included to explain how this object interacts with all the others.

How to represent complex non-living objects in virtual reality simulations.
  The system defines a common structure and means of communication for objects. This deals, once and for all, with how objects should be represented, and how they may interact. The programmer does not have to start from scratch in order to define a new object type-this process becomes a more visual, intuitive process, not necessarily involving a programmer in the conventional sense at all. Designers can focus on the details of their design, without having to worry about its representation.

How to represent complex biological entities: computer players, non-player characters, etc.
  Living things are not easy to simulate, by any means. They are extraordinarily complex, and yet they are intuitively so well understood by us that any inadequacy in their behaviour becomes glaringly obvious. Future virtual reality environments will become so graphically rich that sophisticated virtual life-forms will be extremely important in order to prevent the environment from appearing sterile. As multi-user role-playing games become common, the lack of real people willing to play bit-parts (barmen, guards, foot soldiers) will become a serious problem to the creation of self-consistent worlds.

How to generate artificial intelligence systems, e.g. neural networks.

Despite the assertion that the best, if not the only way to create intelligent software is to model the building blocks of life, no-one yet has sufficient knowledge of exactly how to assemble those building blocks to achieve the task. Many difficulties remain before artificial systems can reach significant levels of intelligence. This simulation system must be capable of representing biological components in a sufficiently un-restrictive way, to allow it to be used as a flexible research and development tool.

How to construct distributed virtual world simulations across large networks.

The future of virtual reality, gaming and simulation in general is inextricably bound up with the growth of the Internet and the future Superhighway. No expensive-to-produce general-purpose engine can afford to ignore the requirement for network distribution and multi-user applications. Happily, the concept of autonomous-object programming lends itself very well to the significant problem of how to run complex simulations on many machines simultaneously, without severe bandwidth bottlenecks.

Gaia Design

General Overview

Gaia is not simply a code library or a class library, but a software architecture. That is to say, it defines a compulsory structural style to be used by all additions to the system. It is composed of three main parts:

1. A data definition (the "cell" (process cell). This defines the uniform interface for all objects and components in a Gaia simulation.
2. Code which supports the data structure. This handles the inter-object communication, the carrying out of the cells' functions, etc.
3. Supervisory code. This schedules the updating of each object in the system and manages other global aspects of running the simulation, such as rendering 3D data to the screen.

A Gaia simulation may or may not involve re-programming and compiling the code. At one level, the system can be seen as a class library, and new cell classes can be derived from the base class to add new functionality. At another level, the system is an application, and new cell types are dynamically defined in the system using high-level operations without requiring a re-compilation. Often the system will be used in both modes.

The output from the system is rendered, textured 3D graphics and stereo sound. Each object in the simulation can have its own 3D polygon mesh, and thus complex objects can be constructed from several articulated or otherwise connected parts, each being represented internally by a cell. Creatures can be rendered as jointed, freely articulating objects, with realistic motion.

The system is capable of networked, distributed use, in a number of different ways. Multiple users can interact in the same simulation, over the Internet or a LAN. A special "mediated peer-to-peer" networking scheme permits very large virtual worlds with many thousands of users, without requiring large server computers or a high bandwidth connection.

Biological Concepts

Gaia is an autonomous-object programming system, designed for 3D simulations of biological and non-biological objects and rich environments. Because Gaia draws heavily from Biology for its design, this section briefly describes some of these biological concepts and their relevance to Gaia.

Cellularity

All biological systems are made from one or more cells. A cell is a membrane-bound bag of chemicals and structures. In programming terms, the cell is the metaphor for the fundamental object type in the system—every object in a Gaia simulation is a cell (process cell).

The cell membrane keeps the outside out, and the inside in, and is thus crucial for the development of living systems. The concept of a membrane equates to the boundary between a cell object's contents and its environment. In biological cells, the membrane is straddled by structures which gate the passage of molecules into and out of the cells. This is the unified means of communication between cells. With few exceptions, all messages between cells are transferred by chemicals which are emitted from one cell and received by others. In Gaia, the basic equivalent to this unified communication system is the plug and socket (see below).

Although cells primarily use a single communication interface (chemical emission/reception), the detailed mechanism can vary according to function. For example, hormones are received by receptors attached to the cell's normal membrane surface, while neurotransmitters, used to communicate messages between nerve cells, act only at specific sites on the tips of long, hair-like processes (dendrites and axons). Gaia's plugs and sockets interfaces come in a number of types to reflect the basic styles found in biological cells.

Biological cells come in many varieties with different functions. These functions are determined by the internal chemistry of the cells, their shapes and the types of chemo-receptors and emitters on their surfaces. Cells are physically or chemically joined together into assemblages, forming organs, systems or whole organisms. Gaia, too, is multi-cellular, in that a discrete object can be formed from more than one cell.

Biological cells are also part of a general recursive concept in Biology. Cells are membrane-bounded systems. Inside them are membrane-bounded systems called organelles. Cells themselves form into membrane-bounded organs, and those organs group into membrane-bounded organisms. The recursive nature of the system extends beyond this into colonies, ecosystems and species, but by this time the membrane-bounded concept has been lost. Gaia's cells are also recursive, in that one cell (parent process cell) can contain many others (child process cells), each of which can contain further cells.

The combination of cell-differentiation, recursive grouping and multi-cellular structures used by biology is the source of its power to express complex and varied systems from a limited set of building-blocks. This is also a key concept underlying Gaia.

Biochemistry

All biological activity is fundamentally chemical. Chemical reactions form a rough equivalent to the mathematical expressions used in computer languages, in that one or more inputs get converted to become one or more outputs. Chemistry differs from maths, in that a) the inputs get used up in the reaction, and b) the process occurs over a finite period, with the rate of change of inputs into outputs varying as their relative concentrations vary.

The general principles underlying such biochemical reactions are a valuable metaphor for many kinds of transformation used in simulations, not only those needed for simulating living things. Therefore the concept of biochemistry has been borrowed for use in Gaia.

Genetics and Evolution

Life has pulled itself up by its bootstraps due to the power of evolution. Simplicity became complexity. It follows, therefore, that the same process has computational power that we might make use of in Gaia.

In nature, the total instructions for creating an organism are kept in the nucleus of every single cell. In Gaia, it is not necessary that every cell contain genes, but it is often a useful mechanism. Hence, certain Gaia cells can contain genetic instructions, out of which whole, multi-cellular organisms can be constructed. They needn't be living organisms, either-sometimes it may be useful for non-living objects to be constructed in the same way.

All the processes that occur in natural genes may also occur in Gaia. We therefore have the potential for evolutionary development of objects, or may use evolution explicitly to help solve a practical problem.

Neurones

An important cell type in Gaia is the neurone. Neurones are relatively simple computational elements which, when combined in large numbers in certain configurations, can produce extremely powerful effects, including learning and intelligence (and, in principle, consciousness). Neurones or neurone-like devices are commonly used processing elements in multi-cellular Gaia creatures and objects.

Key Architectural Components

Cells, Plugs and Sockets

The Gaia architecture is founded upon three key structures: cells, plugs and sockets.

Every object in the virtual world, including the virtual world itself, is composed of one or more cells, and those cells connect and communicate with each other via plugs and sockets attached to their surfaces.

Figure 2:
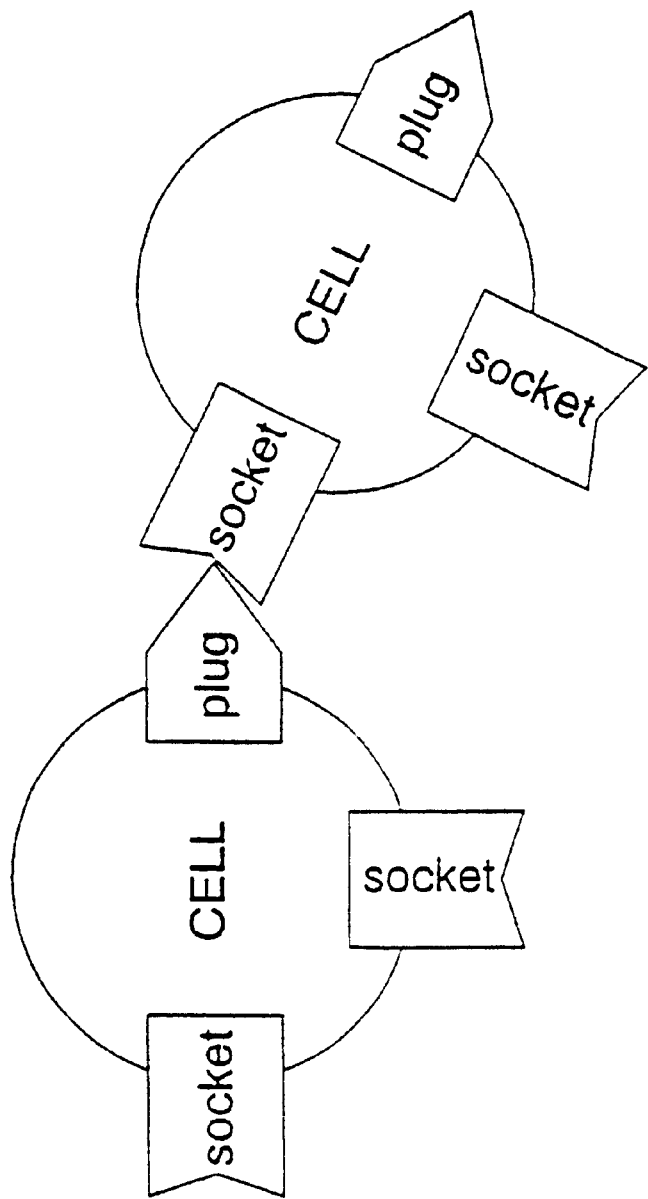
FIG. 2 illustrates process cells, plugs and sockets.

FIG. 2 illustrates process cell plugs and sockets

Cells are like the building blocks in a construction set, such as Lego. The plugs and sockets correspond to the pips and holes on the surfaces of the blocks, which allow them to interconnect. However, unlike Lego, Gaia's bricks are malleable and dynamic, and there are several varieties of pips and holes, which can support more than simply rigid, physical relationships between bricks.

Using biological metaphors, plugs and sockets can also be likened to the various structures which straddle the cell membrane and which connect cells together, allow for absorption and emission of various chemical and other messages, or make the cell sensitive to a particular kind of environmental stimulus.

Despite the biological terminology, cells are not only relevant to modelled creatures. Cells represent every object in a simulation, from the virtual world itself, to the minor working parts of the various objects in that world. Cells can therefore both connect to other cells (a sibling relationship) and contain other cells (a parent/child relationship).

Figure 3:
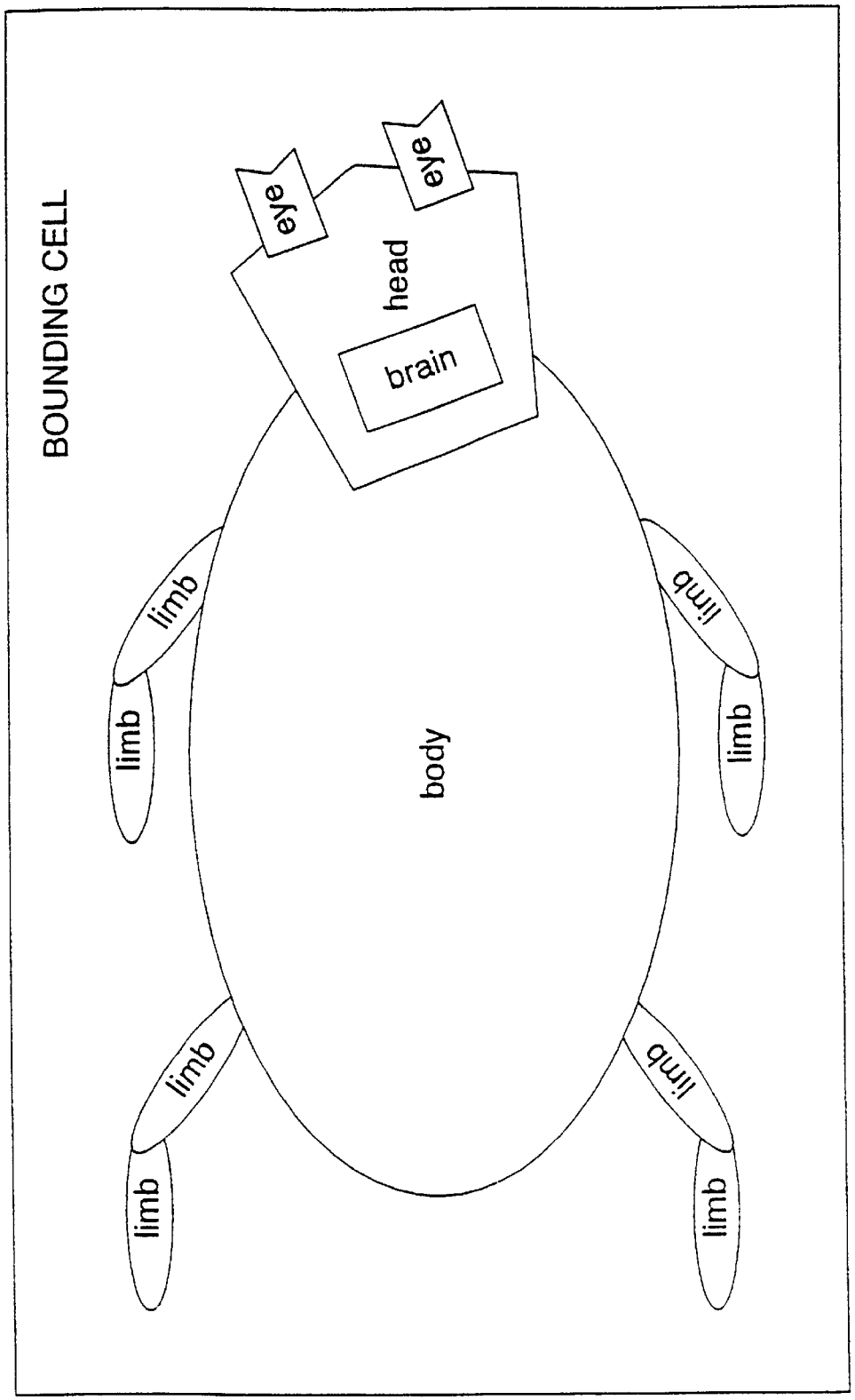
FIG. 3 illustrates a simulation of a creature using process cells.

FIG. 3 schematic illustrates a creature being simulated by Gaia.

A typical object might be a living creature. Such an object would consist of several structural and moving parts representing its body and limbs. These limbs might be activated by nerve impulses emitted from a neural network, also made of cells. Providing the inputs to the neural network might be a number of sensory cells. Surrounding the whole assembly would be a bounding cell, which has a role in co-ordinating some of the internal structures, and also serves to define the creature as a single entity.

As in Lego, a number of different cell types exist, forming a repertoire of building blocks. However, this repertoire may be expanded in two ways: at compile-time, new cell classes may be defined and made available for constructing objects: alternatively, at run-time, general-purpose cells may be configured dynamically by providing code to define their functionality, written in a specialised, interpreted language.

Similarly, there is a repertoire of plug and socket types, performing the various kinds of inter-cellular relationship and communication. These make up an 'internal' construction set for creating the various cell types. The sockets too can have hard-coded functionality but can also exist in soft-codable form, so that new plug and socket types can be defined without needing to re-compile the program. Hard- or soft-coded cell types can be constructed from the various classes of hard- or soft-coded plugs and sockets to produce the appropriate internal functionality and inter-cellular communication.

For example, one of the simplest cell types might be a structural component, rigidly connected to another cell by a "joint" socket. The only functionality defined for this socket type is that it should respond to movements in the cell to whose plug it is connected, by repositioning its own cell appropriately (if the preceding cell rotates, for example, the socket's own cell must be rotated and moved so that it continues to exhibit the same angular relationship to its sibling). A more advanced structural cell might represent a limb segment.

This would have a similar jointed socket connecting it to a previous cell in a limb chain or to the body. However, it would also have a "dendrite" socket (one which connects to a distant "axon" plug on a neurone cell and receives and modulates incoming nerve impulses). This socket would be programmed to flex the limb cell by adjusting the angle on the joint socket in response to electrical stimulation. The joint socket would then respond by computing a new orientation for the cell containing it, as before.

Figure 4:
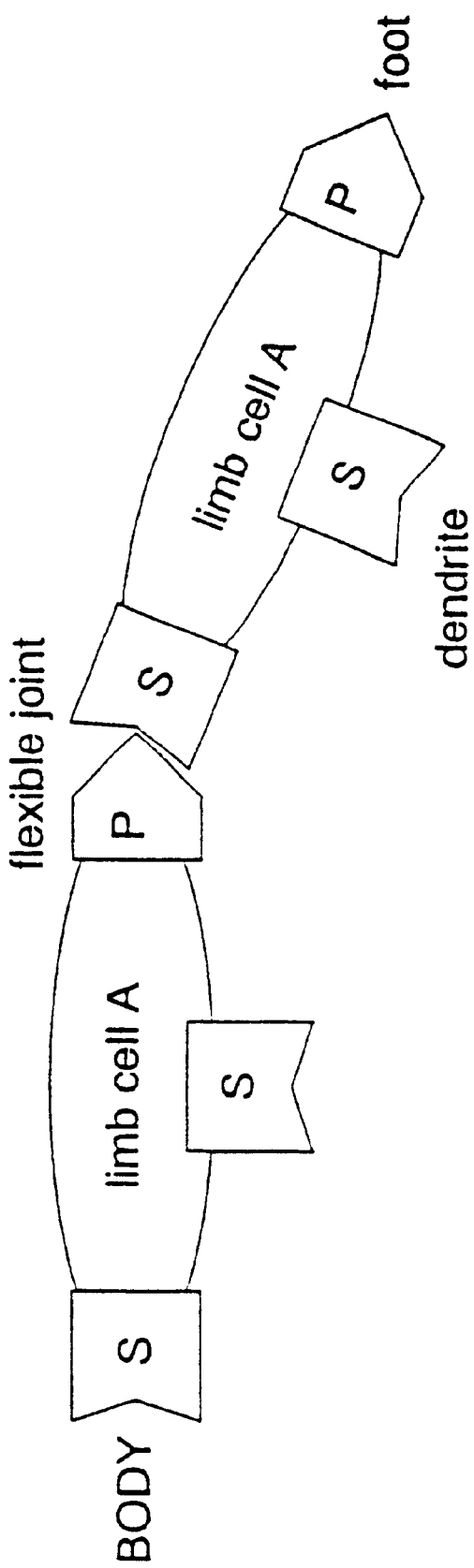
FIG. 4 illustrates a simulation of a jointed limb.

FIG. 4 illustrates a simulation of a jointed limbs using process cells. If limb to cell A moves, its joint plug tells the joint socket of limb cell B, which moves limb cell B accordingly. Alternatively, the dendrite socket could receive an impulse triggering the joint to rotate, thereby rotating limb cell B.

Figure 5:
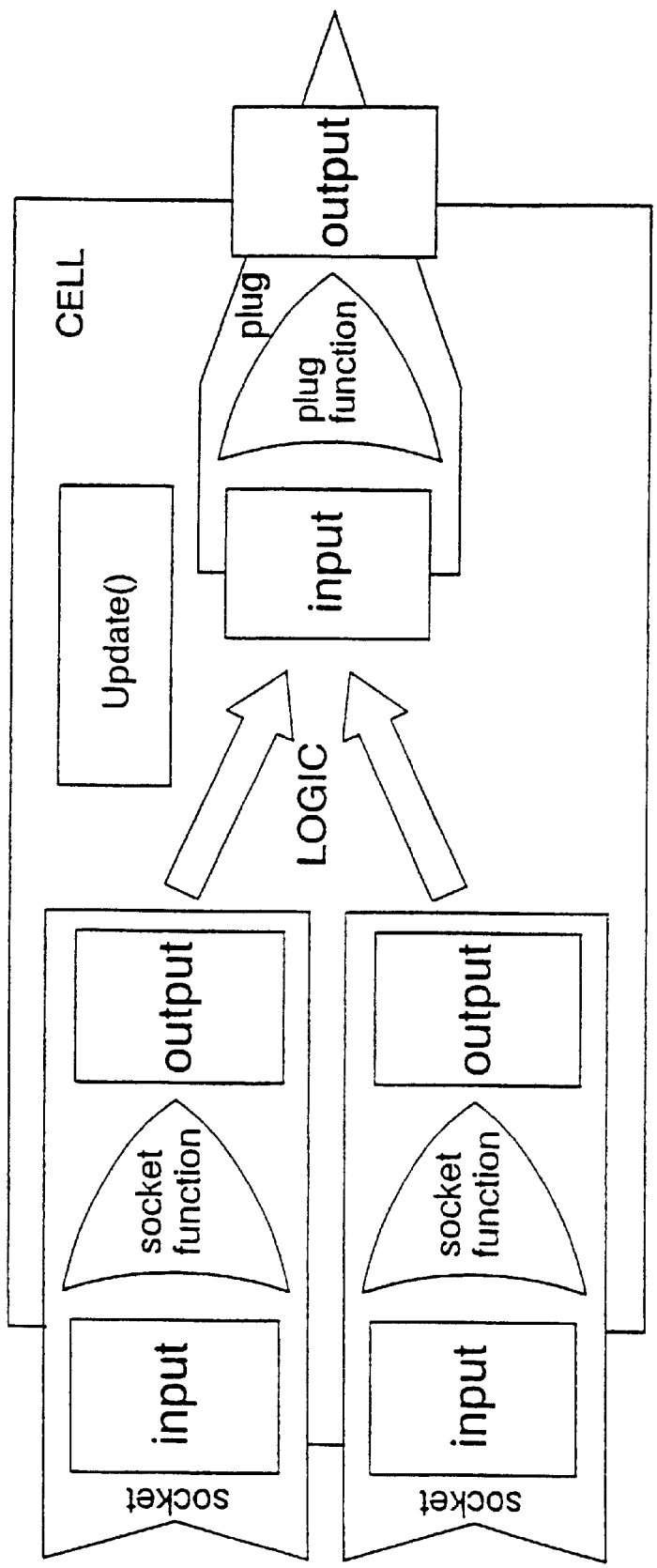
FIG. 5 illustrates the relationship between inputs and outputs in a process cell.

FIG. 5 illustrates inputs, outputs and functions of a cell.

Plugs and sockets don't only express physical or electrical connections. There are also sensory sockets (which respond to changes in another object or in the local environment) and several other basic types, described later. Regardless of function, the concept of "plugs and sockets" represents a consistent interface between cells, and thus allows cells to "plug together" and interact, without any cell necessarily needing to understand the nature or function of any other cell.

The fundamental behaviour of plugs and sockets is as follows: each socket reads some input, often from a plug on a pointed-to cell (pointed to via the programmable link), then processes that input using a function (the programmable logic) to determine some output. Plugs then read the inputs from one or more of the sockets in their cell and compute their own output. In this respect, a cell is a two-stage computational device, reading and processing inputs from other cells and combining them to produce a stare change in the cell itself or an output, readable by other cells.

Besides plugs, sockets and other cells, cells may contain any or all of a number of ocher structures:

Many cells are notional, purely computational structures, and so do not need to be seen by the user or a simulation. On the other hand, many cells represent whole objects, or physical parts of objects, and thus need to be rendered to the screen. Each cell is thus able to contain a visual representation in the form of a mesh of polygons, with textured surfaces representing various material types. If a cell has a visual representation, it must also have a position and orientation in space. This is stored, relative to the bounding cell, in several variables which accompany the other visual data.

Given a physical representation, cells may have need of mechanical properties such as mass, inertia and functions thereof. For example, a jointed creature may have two or more "feet"-cells which represent the points of contact between the creature and the ground. As the creature bends its limbs, these feet will change their position relative to the body, and it is the bounding cell for the creature which needs to interpret these changes and move the whole creature or re-orient it in response to foot movements. If the creature is swimming, then different positional changes will be needed, and the creature's acceleration about each axis will need to be calculated with reference to the creature's inertia.

Cells are capable of hosting a sea of chemicals and their associated reactions. The cell representing a creature's brain, for example, might use simulations of biochemical mechanisms to control feedback to the neurones in the brain in order to make it learn. Biochemical metaphors are useful for more than just biological simulations, however. Chemistry represents a powerful, general-purpose modelling system for many diffuse, dynamical systems, for example to represent fuel consumption in a modelled motor vehicle, or the more complex interaction of fuel and oxidant in a rocket ship.

Figure 6:
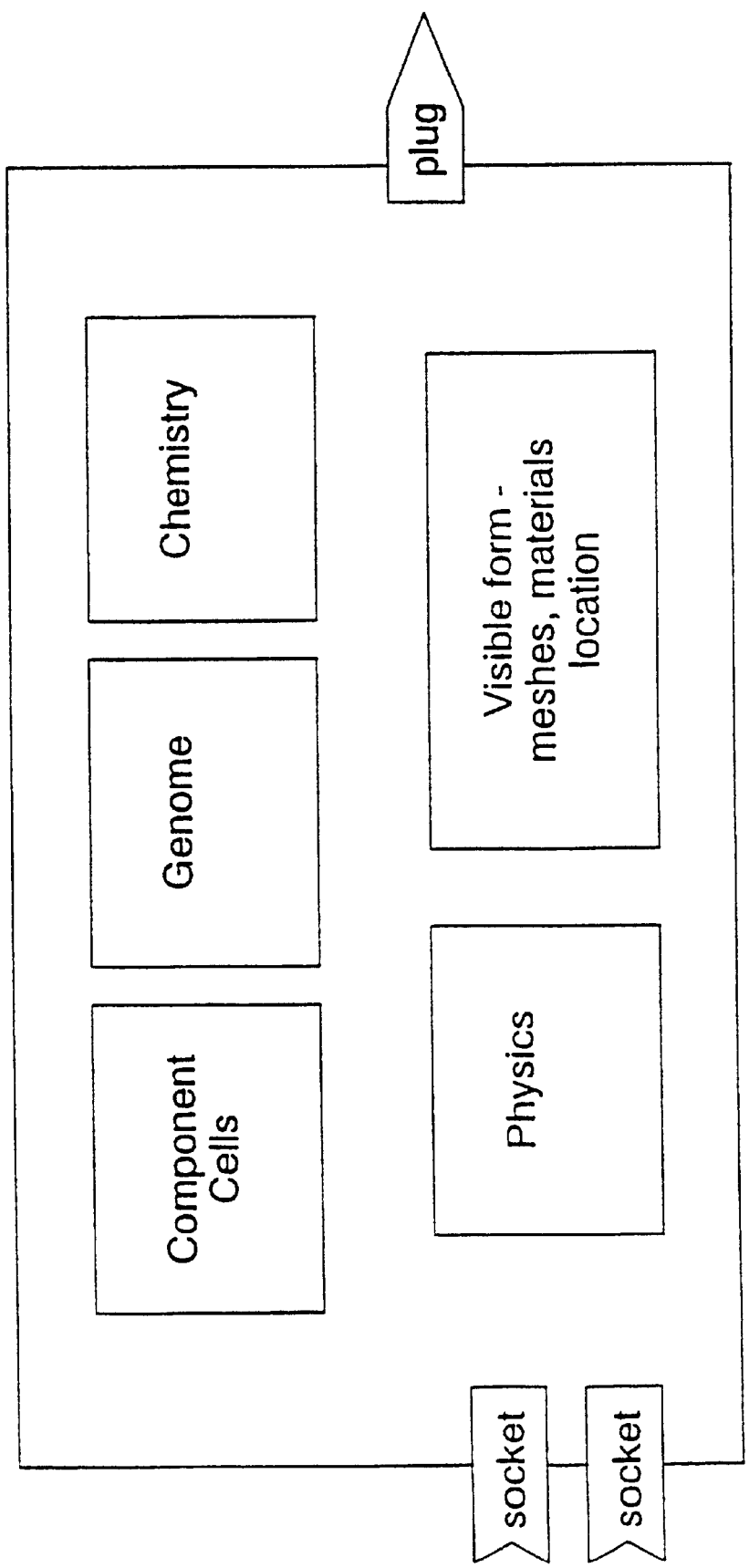
FIG. 6 illustrates the component parts of a process cell.

FIG. 6 illustrates a block diagram of a cell.

Certain cells might contain specialised data and functions. For example, creatures might need to be constructed from genetic instructions, so that reproduction and evolution can be modelled. Cells can be created to represent the germ cells (sperm and egg). Such an egg would contain a genome, created by sexual reproduction from the fusion of egg and sperm. From this a whole organism can be constructed, cell by cell.

Scaleability

An important criterion for the design of the cell and plug/socket data structures is that they are highly scalable. The largest cell in a simulation encompasses the virtual world itself, while the smallest cell might be a simple structural part or a neurone. Because neural networks often contain many hundreds of neurones, and there may be tens of networks in a simulation, it is vitally important that the overhead for defining a cell is minimal, and that the processing load is also very small.

Figure 7:
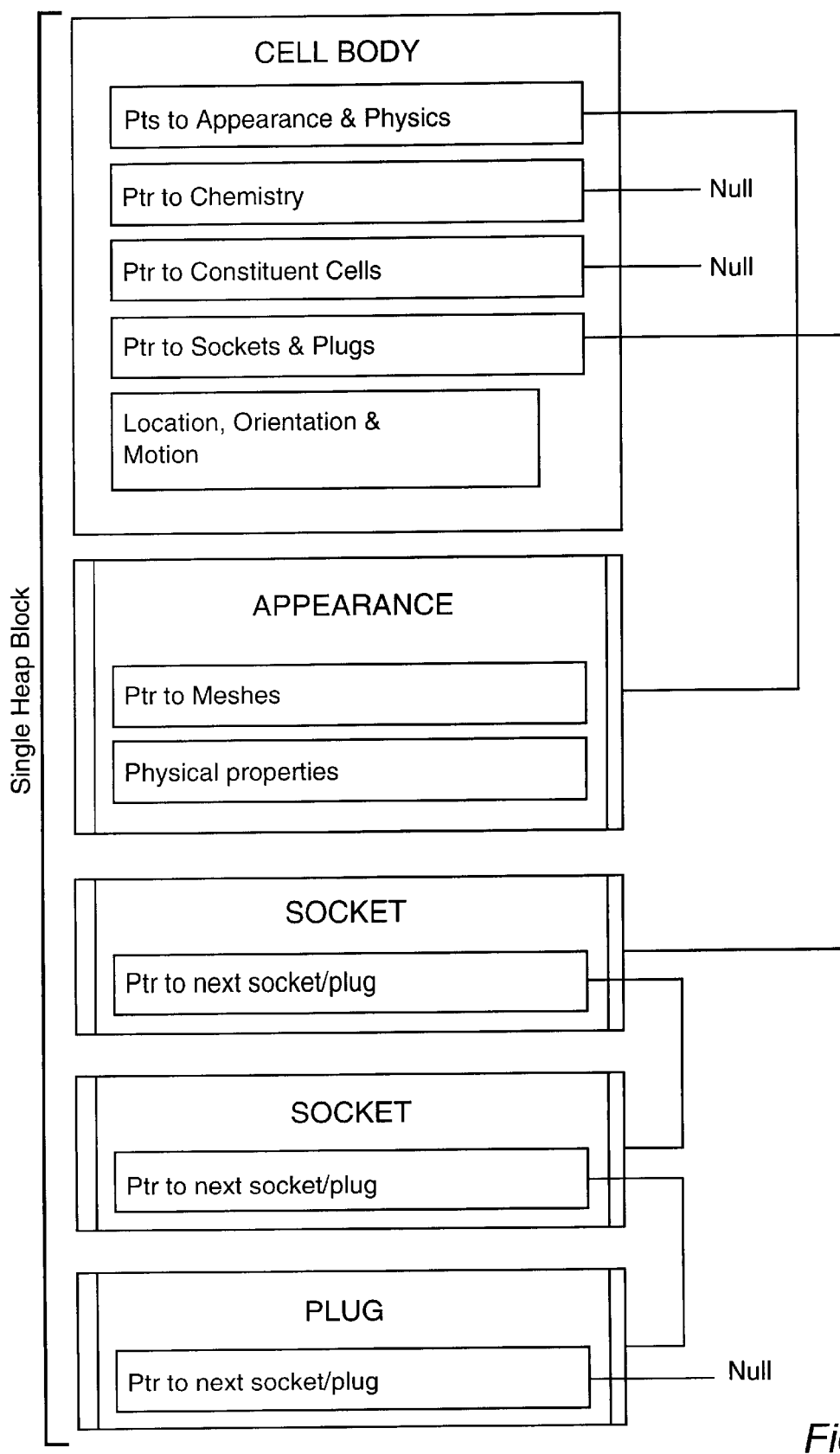
FIG. 7 illustrates a data storage arrangement for the data defining a process cell.

FIG. 7 illustrates a sample cell configuration.

Cells must be able to "inherit" the functionality that they need, without having to inherit that which they don't. Because cells must be capable of dynamic creation and definition, the normal inheritance mechanisms of C++ may not be used, nor can pre-inherited classes of all necessary types be defined, since there are too many combinations.

To provide for dynamic inheritance without excessive overhead, and without losing the member-naming facilities provided in C++, cells will use pointers. Each cell object will have a fixed-size body, containing pointers to other data types. These pointers are NULL if that type of functionality is not required (for example a NULL pointer called Chemistry means that no chemicals and reactions are supported by that cell). Otherwise, the pointer refers to further data objects, stored on the heap immediately after the cell body. Arrays of structures, such as the list of plugs or sockets attached to the cell, are defined as a linked list-the cell body points to the first socket, which points to the second, etc.

Placing the linked lists of inherited structures in the same heap block as the cell body has two advantages: firstly, only one heap-block header is required, saving a few bytes, and secondly, the whole object is contiguous, and therefore will be kept completely in the processor cache while it is being updated, making it faster to process.

Repertoire of Cells, Plugs and Sockets

Plugs and sockets are highly generalised types, whose explicit functionality is usually determined by the various parameters, rather than by coding new functions. Therefore, there is a relatively established repertoire of hard-coded plug and socket types. The following fundamental types are defined:

Rigid and articulated joints—express physical relationships between cells. These relationships can change by rotation and translation in one or more axes. Articulated joints may be used in cells representing limbs, but also in non-living articulations, such as the rotating turret on a military tank, or the axle of a wheel.

Dendrites and axons—basic type for handling inter-neural connections and simulated electronic circuits, etc. The base dendrite type accepts electrical signals and modulates them according to various internal state values (principally Hebbian weights). Those states can be affected by other parameters to handle reinforcement, and the sockets may migrate and form connections with different cells, according to certain rules.

Sensory sockets—this is the base type for handling environmental and object-related sensory data. Sockets derived from this type can sense various changes in either the environment or in nearby objects (either named objects or objects of a given type within a suitable visual/audible range).

Messaging plugs and sockets—related to the above, these structures handle the emission of and response to various types of message, for example a hammer object might exert a force on an egg object by emitting a suitable message about the magnitude of that force from a plug. The egg would receive this in a socket which would compute the necessary changes to the egg.

Point-of-contact actuators—special plug types for acting as propulsive devices. frictional 'feet', grabbers, etc. they interact, not with a socket on another cell, but with the bounding (environment) cell, for example by detecting the height or material at some point on the cell's surface.

Hotspots—sockets which respond to activation requests from an object or the user's mouse. These behave like buttons which can be pressed to invoke some activity in an object.

Chemo-receptors and emitters—these structures interact with the 'sea' of chemicals in the cell which surrounds them. Such biochemistry, in conjunction with 'chemical reactions' performed by the bounding cell, constitutes a global messaging system and general-purpose analogue modelling system for intercellular communication.

The general structure of a socket includes: a pointer to a cell; an index to a plug on that cell; an output and several internal state buffers; and a state (Update( )) function (written in C++ for built-in types, or a scripting language for soft-coded types). Often, sockets will be permanently connected to a particular cell and plug. Sometimes, as in the case of dendrites, sockets may migrate from source cell to source cell as conditions require. Sensory sockets have even more temporary connections to a particular cell: the general behaviour of a sensory cell is to latch onto a particular cell of a given type within its sensory range, and return state data about that cell. If the cell goes out of range, a scan will be made for another cell of that type. Sometimes sensory cells should be "told" to latch onto a specific object, as in attention-directed senses, which are specifically intended to gather information on the object to which a creature is currently attending. Sensory sockets are essentially message-receiving devices, which respond to messages presented on appropriate plugs-If a cell "makes a noise", it will present an amplitude-dependent output on a "noise emitter" plug (as well as generating a user-audible sound); "sound-detector" sockets within earshot will respond to this message by executing their state functions.

Point-of-contact plugs are unusual, in that they do not connect to sockets on other cells, but respond to a point on the internal or external surface of a cell, usually the floor of their environment. The height, slope and material of that point on the surface is used in the calculation of motion. Since an object must move as a unified whole, a small concession to top-down programming is involved, for the sake of efficiency: A creature or other mobile object will make an adjustment to the position of all its limbs/wheels, changing the relation of a point-of-contact plug (such as a foot) to its surface. The foot responds by determining how much it thinks the creature should have moved in reaction to the force on the foot. The bounding cell of the creature receives one or more such messages and computes the total change in location and orientation of the object. Since the constituent cells of the object measure their locations relative to the bounding cell, it is only necessary for the bounding cell to move in order that the whole objects moves. All other things being equal, a limb will attempt to move a foot a certain distance, and the bounding cell will respond by moving the object an equal and opposite amount, so that the foot remains in its original location on the surface. Movements of several feet, combined with the physical characteristics of the creature and the surface and slope under the foot, will often result in a compromise rotation and/or translation of the bounding cell, making a foot appear to slip or slide a little.

Combinations of the above basic socket types, configured in certain ways, create a number of different cellular building blocks or whole objects. The following are some examples of cell types:

Neurones—these are cells which read inputs from a number of dendrite sockets and compute an output on a single plug. The dendrites perform input pre-processing, such as modulation by synaptic weight. The plug then combines all the inputs from the various sockets and computes the neurone's state and then its output. Chemo-receptive sockets provide reinforcement and other feedback information from the brain 'cell' surrounding the neurones. See below for more details as to the feedback mechanisms.

Limb segments—these are cells with physical form and a joint at each end. An additional socket provides an electrical input which, when stimulated, causes the limb joint to bend. Various types of limb, with single or double degrees of freedom, and various input types (including chemical "energy consumption") will be hard-coded to provide a broad set of building blocks for making jointed creatures and humans. Even though these cells are hard-coded, it doesn't mean they have to look the same, of course.

Buildings—these are cells whose external mesh represents the outside of a building, and whose internal mesh represents the inside. Alternatively, there may be "room" cells inside the building cell. Objects which enter the building cease to be part of the contents of their environment and become contents of the building instead, until they leave. Doors into the building are defined by a suitable material type on the mesh surface.

The environment—this may be the parent of all other cells. Object cells move around on the internal bottom surface, of the mesh, using "foot" cells to keep them in contact with the mesh surface. If an environment is acting as a segment of a cellular, mediated-peer-to-peer network game (see later), then any object which reaches the edge of the cell will automatically be transferred to an adjacent cell.

Biochemistry

A simulation of biochemical interactions at the level of concentrations (rather than the molecular level) is available for modelling various types of analogue relationships and diffuse feedback loops within a cell and between constituent cells.

Each cell that requires it can contain a number of variables, each representing the concentration of a particular chemical. This can be thought of as the cell's cytoplasm.

Chemicals are produced by Emitter objects, which are either plugs attached to the surface of cells or the inner face of sockets on the parent cell. In other words, the cell's cytoplasm receives new inputs of chemicals either from external stimuli (via the sockets on the cell's surface) or from internal activity in its constituent cells.

These chemical concentrations are monitored by Receptor objects, which are either the inputs to plugs on the surface of the bounding cell, or sockets on the surface of constituent cells.

Therefore, constituent cells may communicate diffusely with their siblings, a parent's environment may effect chances detectable by its constituents, or constituents may affect their bounding cell's environment.

Chemicals undergo transformations as defined by Reaction objects, which specify a reaction in the form $[_iA]+[_jB] \rightarrow [_kC]+[_lD]$.e.g. 2 'moles' of chemical 3 combine with 1 of chemical 27 to produce 3 of chemical 14. Most transformations are allowed, except for 'nothing→something', for example:

| | |
|---|---|
| A + B → C + D | normal reaction with two products |
| A + B → C | 'fusion' |
| A → nothing | exponential decay |
| A + B → A + C | catalysis (A is unchanged in the reaction) |
| A + B → A | catalytic breakdown (of B) |

Reactions also include a value for the reaction rate, which is concentration-dependent and therefore exponential over time.

Emitters, receptors and reactions therefore constitute a general-purpose, non-linear modelling system. They supply globally-available information to constituent cells and act as a system for communication up and down the cell hierarchy.

A natural function of this biochemical modelling system is to simulate the chemical systems inside living creatures. For example, networks of emitters, receptors and reactions can emulate the chemical behaviour of a creature's digestive, reproductive or immune systems. A particularly important use for the system is to model diffuse feedback in neural networks for controlling reinforcement, cell atrophy, etc.

However, the chemical model can be used by non-living objects or the environment cells, too. For example, the global environment may use chemical concentrations to represent environmental factors such as air temperature and humidity. These factors can be computed (for example, set into cyclic rhythms) by the use of reaction networks. A vehicle might use a chemical to represent its fuel supply-it can re-fuel via a socket and consumes fuel whenever its wheels (constituent cells) are active. A simulation of a nuclear power station could be modelled in chemistry, using chemicals and associated reactions to simulate the temperatures, pressures, fuel-rod positions, output voltages and so on.

An important advantage of using a generalised modelling system such as this, rather than an internal model written in code, is that the various parts of it become available for use in unexpected ways, or susceptible to interference from the outside. For example, a living creature's metabolism could be altered by injecting "drugs", or a simple dynamical model could later be updated with a more sophisticated one.

Genetics

Generally, the assembly of cells into multicellular objects will be conducted using visual editing tools. However, sometimes it is desirable that the complete instructions for the construction of an object reside as data within the simulation. Genetics offers a powerful metaphor for this type of process. A multi-cellular creature, for example, might be "grown" from a single germ cell, containing the genetic instructions. These genes could have been modified by "sexual reproduction" between creatures, involving crossing-over and mutation.

The same technique might have applications in non-living objects. Spacecraft, for example, would not be expected to reproduce, but the genetic storage of their blueprint opens a number of possibilities for the creation of varied styles of spacecraft by "mutating" the aenome. Similarly, environments and environmental objects can be given random or evolved variation using genetic blueprints.

Each genome is haploid and consists of a string of genes. Each gene is an arbitrary string of "codons". Each codon is a value, usually representing a given parameter for the cell being constructed. Alternatively, codons may be commands, followed by one or more operands. Codons are forced into a valid range at read-time, thus allowing random mutation without producing illegal values.

To construct the creature or object, the string of genes is processed in sequence, starting at one end. The header of each gene determines the type of cell to be constructed, and the successive codons represent cell-specific (or plug/socket-specific) parameters. Each cell type, and each plug/socket type known to the system, whether hard-coded or soft-coded, is associated with a gene-reader function, which understands how to express a gene. Soft-coded cell types have soft-coded gene readers.

Other header data in each gene are used to represent gender (only really relevant to creatures) and switch-on time. Genomes can be re-expressed at intervals, and new genes may switch on. This allows creatures to "grow up" and develop new features and behaviour at various stages in their life cycle.

Germ cells (acting like sperm and eggs) can engage in sexual reproduction (usually with the help of the bounding organism), during which the male and female genomes get spliced and crossed over, to produce a daughter genome that inherits some genes from each parent. Errors during crossover can cause genes to be repeated or omitted, or codons to be mutated. This allows successive generations to develop new features that none of the parent generation had. For example, a single-jointed creature might give birth to a mutant creature with two limb joints on each leg, or a biped might turn into a quadruped. Such remixing and mutating of genes can lead to creatures which genuinely evolve over time, in response to their differing survival values.

Because genetics can control the development of structures, and those structures can hold functional relationships as well as structural ones, the system supports the use of evolution in more ways than mere morphological variation in creatures. For example, a neural network might be designed using Gaia, and then allowed to evolve and adapt better to the task it is given. Even though Gaia is fundamentally a 3D virtual reality modelling system, it is also a general programming system, and can utilise genetics and cellularity for more than concrete simulation.

Scripts

An integral part of Gaia is a high level procedural language interpreter, or rather a family of them. Although most types of plug/socket and some types of cell are compiled into hard code (using C++, the language that Gaia itself is written in), plugs, sockets and cells can also be defined on-the-fly, by creating event scripts-small pieces of interpreted code to provide the socket and plug state functions. This is very important, as it allows new kinds of Gaia object to be imported into simulations without recompiling them, and even without stopping program execution (for example, by downloading them transparently across the Internet).

Not only can scripts be stored in cell objects, to be executed during cell updates, they can also be "pumped" into the application from outside, and executed immediately. Scripts (in ASCII) can be supplied by specialised software (applets, for example), or even by conventional applications such as Microsoft Excel. They are sent to Gaia via an OLE Automation interface, and are executed immediately. These scripts can be used for many tasks, and can perform just about any action on the system.

Scripts are mainly used for the following tasks:

Soft-coding of plug, socket and cell types to add to the cell library dynamically.

Construction of new, multi-cellular objects, usually via visual editing tools.

Manipulation of the run-time environment, also usually via visual tools.

Communication with user-interface applets, for example to allow users to monitor aspects of the system.

There will probably be a need for three script languages in the system:

An extremely streamlined expression language, designed specifically for simple computational cells, especially neurones. This is designed to execute extremely rapidly. Its syntax is also designed to be non-brittle (see below), meaning that scripts can be included as part of the genetic definition of a cell, without risk of mutations causing syntax errors, or necessarily reducing a valid expression into a meaningless one. This then allows the internal functionality of neurones to be genetically defined and therefore susceptible to evolution. New neural network systems can be evolved using this scheme.

A very efficient, quick-co-parse but powerful language for most applications as cell scripts and immediate-mode scripts. This language will be tokenised internally, for rapid execution. It will support most of the normal control constructs, such as structured loops, block if/then/else, etc. Its expression handling will be streamlined for efficiency, but most normal programming techniques will be possible, even if its syntax is a little terse. An important aspect of this script language is that it is multitasking—after each instruction (except the very rapidly executing ones such as loop heads), the script will suspend execution until the next scheduler tick. This will allow many scripts to run concurrently:

It may be desirable to add a third, very high level language for general scripting. This would not be multitasking, nor be specialised for use in Gaia, but would allow access to the run-time simulation from the outside using a recognised standard language. One possible candidate is Microsoft's Visual Basic for Applications, another is Java.

The OLE Automation interface which provides access to the script interpreter from the outside will also be network-enabled. This will mean that a suitable application can directly manipulate or monitor a simulation running on a remote computer.

Key System Components

Supervisor

The supervisor (scheduler) controls the scheduling of object updating. At every tick of a clock, the supervisor scans the tree of cells and calls their Update( ) function. Since the cell system is recursive, the supervisor will simply call the Update( ) function of the outermost (universe) cell. This will call the Update( ) functions on each of its constituent cells (buildings, rooms), which will call Update( ) on their constituents, and so on down the hierarchy.

Any cell at any level can decide to "so out of scope", and ignore requests to update itself. This will also lock off any constituent cells. This mechanism could be used to "freeze" (or slow down) regions of a large simulation that were currently not relevant (because they were off-camera, for example).

Before each cell executes the Update( ) functions of any constituent cells, it first updates each of its sockets and then plugs (in other words, it updates itself). Information therefore flows down the object hierarchy, through cell boundaries, in synchrony with the Update( ) calls.

Renderer

The dominant form of output from Gaia is three-dimensional graphics. Each cell can optionally contain graphical and geographical information, and thus be rendered to the screen. The graphical information is in the form of a textured polygon mesh (possibly two separate meshes, if the object needs to be visible from both inside and outside).

Each polygon may be textured, and each texture represents a different "material". The materials are drawn from a cached library of available types, and have physical, as well as visible properties. For example, "glass" must appear transparent and must be capable of conducting visible data to sensory cells. "air" is also transparent, but does not act as a boundary-internal cells may pass through "air" polygons and become constituents of an adjacent cell (a creature walks into or out of a room, for example). Other, solid materials such as brick and metal have their own texture maps and also their own unique physical properties such as friction.

Environmental cells use polygons made from such materials to represent the ground, walls, roof and openings of that environment region. Body parts such as feet on multi-cellular creatures, or wheels on vehicles, may sense the location, slope and material on their bounding environment cell and use this information to compute movement, etc.

The renderer may, for example, be based on Microsoft's Direct3D system. It will therefore have the following features:

Multiple, coloured light sources; Gouraud shading; shadows; mip-maps: transparency Hardware acceleration on a wide range of video cards Support for new display technologies such as VR goggles A world-wide standard, with good support and a long future Direct3D's Retained Mode (high level scene engine) may provide this function. However, if this conflicts with needs for mesh or texture/material storage, a specific renderer can be used on top of Direct3D's lower level Immediate Mode.

Network Support

Gaia will support networked operations in a flexible way by incorporating them directly at the level of the cell. Any cell containing suitable plugs and sockets will be capable of networked communication. This does not mean, of course, that every cell will communicate across a network, simply that networking can be built in at any level in the cell hierarchy. At its simplest, suitable network plugs can be programmed with another machine's IP address, and fetch or send state data as packets across the Internet or a LAN in much the same way that other plugs and sockets communicate on local machines.

Above this level, there will have to be infrastructure to support one or more distributed computing and software delivery methods, as well as support for online billing and account management.

In order to support multi-player games with large numbers of players, a specific mechanism for distributing environments and objects across many machines and synchronising them is defined. One approach is to use server computers to hold the world data, and use client machines purely as rendering stations and user interfaces. This is the most common method for online gaming and simulation. However, there is also the possibilities of a novel approach, called "Mediated Peer-to-Peer" (MPP).

An MPP system would work as follows: User A is in a region X of the virtual world. His computer therefore contains a complete copy of region X, including all the objects that are currently in that region (his own virtual persona being one of them). User A moves around region X, viewing and manipulating objects. One of those objects is the persona of user B. User B also has a complete copy of region X on his machine. The two or more instances of region X remain in synchrony with each other because each object is responsible for telling all of its clones on other machines that it has been updated in some way. User A manipulates his persona, which tells its clone on user B's system to change appropriately. User A's and user B's computers send these messages directly to each other across the Internet, without passing them through a server.

So far, this scenario is identical to two friends playing Doom over the Internet. However, suppose user A walks through a doorway, which takes him out of region X and into region Y. User A's computer tells user B's that user A has gone from view, and the connection between the two machines becomes broken. User B's machine no longer bothers to tell user A's machine about the changes to its objects. User A now has to take up residence in region Y. In order to do this, he needs to know which other users and non-player characters are in region Y, and also what it looks like. He may have the basic data for region Y on his CD-ROM or hard drive. However, to connect properly to region Y he needs the help of a server. The system automatically contacts the main game server and explains that user A is now in region Y. The server knows which other users (say C and D) are currently online and in region Y, so it sends their IP addresses to user A's computer. User A's system then contacts one of these other users' systems to establish the location and nature of all the objects. User A's computer can now construct an identical version of region Y to the ones existing on user C's and user D's machines. Users A, C and D now conduct a peer-to-peer conversation, exactly as users A and B had before.

Figure 8:
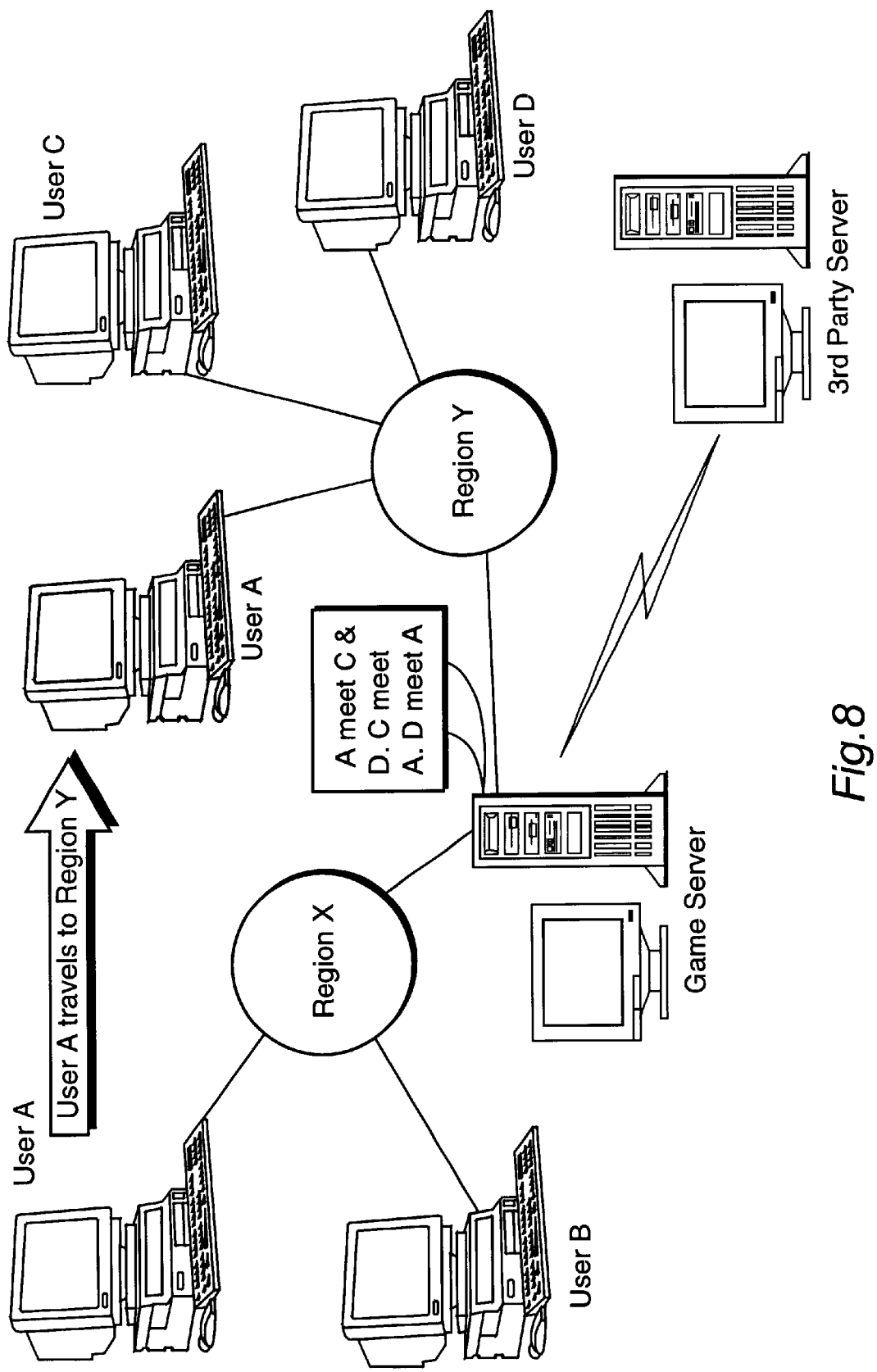
FIG. 8 illustrates a mediated peer to peer network using process cells.

FIG. 8 schematically illustrated the Mediated Peer-to-Peer arrangement.

MPP has some very advantageous features:

1. The server is only acting as a "dating agency" for introducing users to each other, so that those users can then conduct peer-to-peer communication to keep their current virtual world region updated. All this happens transparently, and the users are unaware of it. The important point is that the Internet is being used efficiently, as a many-to-many network: most of the traffic in the game is between users' own PCs, and along different routes. Instead or massive amounts of client/server communication, the server need only send trivial amounts of data. In this "clearing house" role, the server has no bandwidth bottleneck to contend with, and needn't even be a particularly powerful computer.
2. The MPP system effectively allows many thousands of people to play one-against-a-few, peer-to-peer games, just as people today play Doom or C&C across the Internet. However, all these people are playing different sub-games in different areas of a single, huge, virtual world. They may move from one region to another (from one group's "game" to another) transparently. The virtual world is a vast array of tessellated regions. It need have no limits and can have a complex and varied geography. The tessellated nature of the system allows the same, or essentially similar regions to be re-used in many places, juxtaposed differently with their neighbours. The whole world does not exist on a server, but on many people's machines out on the Internet. On the principle that a tree falling in a wood does not need to make a sound if there is no-one there to listen, any region that ceases to have any current users may simply be reset to a default state; alternatively, its state may be uploaded to the server for safe-keeping.

MPP requires the use of an autonomous-object system such as Gaia. MPP may also be applied to other virtual world activities (such as shopping or access to other $3^{rd}$ party services).

Support Library

Routines and plug/socket/cell types can be provided that are sufficiently useful to be incorporated permanently into the system. These constitute a support library, closely integrated with the type libraries. Some example components include:

Speech/text—Text parsing facilities and hooks for speech input and output. The base level structures for handling these are plugs and sockets. For example a plug can be defined for emitting speech, or a socket for receiving it/recognising it.

Navigation—A perennial problem for virtual world simulations is the development of algorithms for free and human-like navigation around arbitrary and complex landscapes. Some of the methods for solving these problems use a neural network based upon Gaia.

Development Tools

Because of the 3D graphical output from Gaia, and the immediate-mode scripting interface that allows Gaia to be manipulated programmatically from external applications, Gaia is extremely well-suited to the use of highly visual development tools. Some Gaia development involves programming (either C++ or scripts), but much of the work of developing a virtual environment and objects can be handled graphically and intuitively.

Since Gala objects are autonomous, they can be developed in isolation and imported into a virtual world when debugged. It is also equally possible for many people to develop objects and scenery simultaneously, in a single virtual world, over a network. The co-developers needn't even be in the same building.

The development suite for Gala includes the following:

Mesh editors and other 3D modelling programs

Script editors and debuggers

Object assembly editors

Diagnostic monitors

Gene editor, biochemical reaction editor

User Interface

Gala can be hosted on Win32 systems (NT servers and Windows95/97/NT4 clients), and the user interface can therefore be Windows-based (although the system can be ported to high-end Unix systems for other applications).

The vast majority of Gaia's user interface is actually the virtual world itself, and full use is made of the 3D environment as a user interface system. For example, if we want to make new objects downloadable across the Internet (for a fee), the user will walk into a suitable virtual shop, perhaps discuss issues with the shopkeeper (a synthetic human) and buy full 3D-rendered objects over the counter.

Outside the 3D environment, some interface features are required (a Quit menu, for example). However, these are designed as dynamically-defined features. For example, pressing toolbar buttons does not execute hard-coded functions but runs scripts. The nature of those scripts can be decided and changed at any time. Likewise the text of menu options may be dynamically altered by issuing scripts to the system.

Applications

Applications for Gaia are many and varied. The following scenarios are merely suggestions which illustrate some of the application areas and techniques for implementing them.

Scenario 1: Gold Rush

This scenario describes a hypothetical multi-user game, which utilises several of the unique characteristics of Gaia.

A new user finds himself stepping out of a stagecoach into a verdant valley. In the distance a wisp of smoke suggests habitation, perhaps a settlement, but nearby there is nothing but open grassland. The user checks his equipment and strides off into the hills. Finding a cool mountain stream, he reaches down and idly swirls the pebbles of the river bed. As the clouds of sediment clear, tiny metallic particles begin to glisten in the Californian sun . . .

The game starts out as virgin territory, and new arrivals have to fend for themselves in open country. Some prospect for gold, while others choose to prey on the prospectors, or attempt trade with the native people. They hew trees for their own ramshackle houses, in which to store their few possessions. Gradually, the newcomers settle in groups, forming the beginnings of a village. Once enough people are in one place, some of the settlers trade in their gold and start up local businesses. A bar and casino opens, and soon the place is crawling with rowdy, trigger-happy drunks. Someone nominates himself Sheriff, and vows to clean up the town. Others band together and take up cattle rustling.

In a game such as this, many people can be exploring different regions of the same landscape, searching out potential in the underlying geology or demography. Hundreds or thousands of settlements can form in the varied regions of the tessellated, mediated peer-to-peer landscape. As people settle and accrue wealth, they gain the ability to buy new facilities and the landscape develops its own demographics. Social interaction can vary from place to place, as lawless areas segregate from the more civilised regions where people are intent on building up their earthly resources. Occasionally, the balance changes as the game-lords who oversee the system deliberately de-stabilise certain areas and provide new experiences for their inhabitants: an earthquake perhaps, or a raid by aggravated Indians, or the opening of a railroad. When people get bored with life in the sticks, they can travel to the burgeoning cities, where guns are freely available, and a black market exists. Starting from virgin territory allows the system to develop gently and become self-sustaining, as technology improves and more power is matched by stronger infrastructure.

Scenario 2: Sim-biosis

This scenario is a single or dual player software toy, in which the user creates a real, living landscape, building his own ecosystem from a wide repertoire of biological building blocks.

At his or her disposal are cells representing many biological components: stinging cells, digestive cells, reproductive cells, limb joints, swim bladders, fins, nerve cells, light and colour sensors, touch sensors, and so on. Each cell type carries out its own function, and, when assembled sensibly, whole organisms can be constructed.

For example, a user might create a free-swimming creature, by providing fins and powering them using a nerve cell that emits regular pulses. At the head end he might place a row of stinging cells around a digestive cell. A combination of light sensors, nerves and fin cells create a creature which can steer itself in the direction of the green plankton which swim freely around the world. Colliding with those plankton stuns them and the digestive cell remains in contact with them long enough to extract some nutrition. The part digested plankton then falls to the bottom of the pool, offering opportunities for another species of scavenging creature . . .

All those muscles and stingers demand energy, and the creature must be sufficiently effective at finding food to offset the energy loss. The more complex the creature, the more food it needs to capture, and so the more advantage there is in making it intelligently prey on the larger animals.

When a creature gains enough energy, it will reproduce. If it is a smart enough species to be able to find and mate with a creature of the opposite sex (perhaps sought by sensing some special combination of coloured cells or a pattern of light emission), then reproduction can be conducted with less requirement for free energy. The new-born creature starts as a single cell, and gradually grows into an adult. Sex and mutation might make it slightly different from its parents and it might therefore have a better survival value. And so the race evolves . . .

In single-player mode, the fun is to create a stable ecosystem of sophisticated creatures, which can cope with the vagaries of their varied environment. Much of the time, the user will simply watch them and study their behaviour and habitat preferences.

In multi-player mode, several people share access to the same environment, but this time, each user has a score, derived from the amount of "biomass" belonging to him. The more successful his creatures are at consuming the natural plankton, colonising the best locations for photosynthesis, or preying on the creatures belonging to other users, the more biomass will accumulate in that user's favour. As a player's score rises, he is rewarded by gaining access to new and exotic cell types allowing him to build still more sophisticated creatures.

Scenario 3: Designing a shopping mall

This scenario explores the use of Gaia in real-world simulations. The aim is to explore the dynamics of various aspects of a design for a shopping mall.

The mail is modelled in full 3D, and the user can fly around the landscape as in any architectural simulation. However, this landscape is different because it contains shoppers. These shoppers are individual synthetic people, derived from a general type but modified to represent the various kinds of people you might meet in a town centre and their motives and interests.

Each person has some reasons to be in the mall and seeks to achieve their aims. Some are regular shoppers, who have been given plenty of opportunity to explore and learn their way around. Some are newcomers, who don't know where Woolworth's is yet. Others are tourists, who are happy to stroll unhurriedly through the narrowest of busy walkways. Some are men, who won't travel more than twenty feet into a shop—if they don't find what they want, they won't buy anything. Still others are hoodlums, who like to kick Coke cans around the street and scare old ladies.

The simulation is run and the shoppers are allowed to interact with each other and with the landscape. Panning around using the camera, the architect is able to identify problems with her design—perhaps a bottleneck on an escalator, or a place where drunks tend to hang around, out of sight of the local policeman. Each agent in the system can assess how successful his or her day has been, and the architect can gather an overall measure of the various psychological factors, such as success, fear, happiness and tiredness.

In response to these observations, she can remodel and rearrange some of the buildings, Maybe she'll add a few trees and an ice-cream van in a central square. Maybe a book shop would be better at ground level to attract browsing passers-by.

Finally, the architect might explore what could happen if a fire started at a particular location. Where are the bottlenecks? What does the crowd do? How long does the fire service take to arrive? In real life, the answers might not be exactly the same, but the general dynamics of interaction are likely to be informative, and at the very least, the real appearance of a busy shopping mall might give people a better idea than the usual sanitised architectural drawings.

Scenario 4: Research into neural networks

This scenario describes a research project into neural network design. The task is to explore a new mechanism for the feeding back of reinforcement into a network.

First the researcher needs some creatures and a world to put them in. Rather than spend months developing a world from scratch, he can borrow an environment that was developed for a game. As the reinforcement mechanism is meant to give a more human-like mental behaviour than the Pavlovian model used up until now, the researcher selects a stock human from the library. He modifies the human's sensory apparatus, making it perform more pre-processing, so as to provide suitably abstracted sensory data for the network.

He then sets to work constructing the network: wiring neurones together and setting guestimates for their parameters and function scripts. He lets the synthetic humans loose, among objects which have been specially chosen to provide a stressful experimental environment for his subjects, in the manner of a psychologist's rat maze.

The network doesn't perform as expected, so he uses monitoring equipment to establish the likely cause of the problem and adjusts various parameters in response. Now it starts to work, but not as well as he had planned. Perhaps the parameters need tweaking? They are highly inter-dependent, and hoping to get it right by hand is not promising. Happily, the network was wired up by the researcher's use of the Gene Editor, to construct a genetic representation of the neural wiring and parameters. All he has to do now is clone off a few dozen synthetic humans, apply some random variations to their genes and let them attempt to survive and reproduce. Evolution will probably do the rest.

Once the new network circuitry has been proven, it can be applied to some real-world tasks . . .

Scenario 5: Applied technology

The above scenario showed how Gaia provides a powerful tool-kit and test-bed for the development of Artificial Life and A.I. technology. However, it doesn't follow that such technology must be finally implemented in Gaia.

The above part-engineered, part-evolved neural network topology might have applications in embedded systems. For example it might be a useful way to let a car's engine management system learn about the foibles of its driver and the environment in which it operates, and so provide better fuel economy and response. Developing such a system without Gaia would be expensive and involve much speculative programming work. With Gaia, all the building blocks exist in advance, and the visual tools and environment make it very much easier to experiment with a design. Once a suitable design has been developed, however, it is a relatively straightforward process to abstract all the salient aspects of the design and re-code them in a single-purpose, efficient form, to produce an application small enough and efficient enough to be embedded into a micro-controller.

Further Examples

The above has described a consistent mechanism for encapsulating the behavioural representation of objects, and forming channels of communication between them, this system uses analogies with cytological and other biological structures to define a number of data structures and functions.

Each object in a simulation is considered to equate to a biological cell, and the interface for communication between such objects is analogous to the various structures found within biological cell membranes. Additionally, analogues of biochemical interaction and genetic coding are used to model diffuse, mathematical relationships between and within cells, and to define the structural relationships between cells respectively.

The base data structure for objects is a "cell", composed of a number of other structures. These structures include "plugs and sockets" (a generic description of the inter-cellular communication interfaces), "chemistry" and arrays or assemblages of other "cells". In addition, each cell can optionally contain visualisation data to allow it to be rendered visible on a computer display. The basic block diagram of a "cell" is given in FIG. 6.

Sockets and Plugs represent a consistent interface between cells. Various types of socket exist or may be defined by programming. For example, plugs and sockets can connect cells together in rigid physical arrangements or form articulated joints between cells. Other styles of plug and socket can represent "electrical" connections between remotely located cells, as in the interconnections between biological neurones. More diffuse or temporary relationships between plugs and sockets can mimic sensory organs (movement detectors, sound sensors, etc), or handle the transfer of messages from cell to cell, representing various physical or chemical interactions, such as the application of a force or a response to the presence of a "hormone". Sockets can also act as a point of contact for user interaction with objects in a simulation, for example acting as "buttons" which can be "pressed" using a mouse.

TABLE 1

Example plug and socket types

| | |
|---|---|
| Rigid and articulated joints | express physical relationships between cells. These relationships can change by rotation and translation in one or more axes. |
| Dendrites and axons | basic type for handling inter-neural connections and simulated electronic circuits, etc. |
| Sensory organs | base type for handling environmental and object-related sensory data. |
| Messaging plugs and sockets | handle the emission of and response to various types of inter-object message. |
| Point-of-contact actuators | plug types for acting as propulsive devices, frictional "feet" grabbers, etc. |
| Hotspots | sockets which respond to activation requests from an object or the user's mouse. |
| Chemo-receptors and emitters | interact with the "sea of chemicals" in the cell which surrounds them. Chemical in turn interact via "reactions" |
| External sensors/ effectors | can sample data from outside the application or computer, e.g. reading data from an A/D converter or live stock market data from the Internet; can effect changes outside the application or computer, e.g. sending messages to other applications or driving motors. |

Cells are recursive objects, and thus may contain assemblies of other cells, as well as be connected in sibling relationships using plugs and sockets. Organisms and other objects in a simulation may therefore be described as multi-cellular entities, producing composite behaviour from the interactions of many parts. The concept of a "cell" extends outwards from the objects and their components to include a representation of the virtual world environment itself, and any sub-environments such as buildings, rooms or vehicles.

TABLE 2

A selection of basic cell types

| | |
|---|---|
| Neurones | cells which read inputs from a number of dendrite sockets and compute an output on a single plug. The dendrites perform input pre-processing, such as modulation by synaptic weight. The plug then combines all these values and computes the neurone's output. Chemo-receptive sockets provide reinforcement and other feedback. |
| Limb Segments | cells with physical form and a joint at each end. An additional socket provides an electrical input which, when simulated, cases the limb joint to bend. |
| Creatures | Multi-cellular, often jointed objects, maybe with neural networks for the brains. |
| Non-living objects | Single- or multi-cellular objects such as vehicles, machines, etc. |
| Buildings | Visual and environmental representations of buildings, perhaps with room cells inside them. |
| The environment | the parent of all other cells. Object cells move around on the internal bottom surface of the mesh, using "foot" cells to keep them in contact with the mesh surface. May be environment acting as a region of a mediated-peer-to-peer network game (see below). |

Plugs and sockets consist of data storage for input, output and internal state variables, plus code to define their state functions (how they convert input into output, and how their internal state changes in the process). This code may be defined in the same language as the rest of the system and complied into applications of the system. Alternatively it can be defined using an interpreted, high-level language, which thus allows new objects to be defined and created dynamically. without re-compilation.

A cell exhibits behaviour by processing the state functions of each of its input sockets and then each of its output sockets in turn (the sockets fetch their input from other cells, and the plugs fetch theirs from the outputs of the owning cell's sockets). It then gives each of its component cells an opportunity to update itself in the same way. Program control therefore follows a recursive path through the hierarchy of cells and their sockets and plugs blindly calling their state functions to allow them to determine their outputs. Some of these outputs will involve changes to the appearance and positions of cells, and thus produce behaviour which can be viewed by the user as the output of the simulation.

The overall behaviour of the simulation is determined by the myriad interactions and changes of state within the cells which make up the virtual environment and objects. Each cell, each plug and each socket is computationally autonomous, and contains all the details needed to allow it to update itself. No part of the system needs to understand the particular function or meaning of any other part of the system, nor need it explicitly co-ordinate any of the actions of those parts. Thus the system is independent of the exact nature of the simulation it is running. It also serves to reduce the complexity of interaction that the system and the designers have to handle, thus reducing development time and limiting the number and scope of errors.

Because the functionality of plugs, sockets and cells may be defined using an interpreted language, and because the system allows for arbitrary code routines written in this language to be executed within the system by external applications (via an inter-process communications system, such as Microsoft's OLE), it is possible for new object types to be constructed on-the-fly, and incorporated into an existing simulation without requiring re-compilation or the halting of the simulation. Such a process can also be handled remotely across a network.

Cells may be connected together into physical or information-flow relationships either explicitly, using editing tools, "genetically", by encoding the instructions for inter-cellular relationships and cell function into a string, which can be treated like a genome, and transcripted, mutated and crossed-over. This system allows the definition of creatures (and other objects) which can reproduce, mutate and evolve.

A common use of cells in this system is to act as neurones in a neural net. The state functions (those which define the functionality of the sockets and plugs (dendrites and axons) in the neurones) can be expressed in a highly simplified interpreted language. In this language, numbers are used to represent opcodes and operands. The opcodes include mathematical operators and conditionals, while the operands are indices into tables of internal variables within the neurone (such as the neurone's inputs, state and output). The opcodes and operands are mapped and interpreted in such a way that no mutations in the function string can produce syntax errors. These function strings may be inserted into the genetic instructions for constructing a neural cell. Neurones can therefore be genetically defined, both in terms of parameters and state functions, and those functions remain robust even if mutated.

TABLE 3

Description of expression language

| Token | Operand | Opcode | State table entry |
|---|---|---|---|
| 0 | INPUT | | sum of i/ps |
| 1 | ANDIP | | andid sum of i/ps |
| 2 | STATE | | cell state |
| 3 | THRES | | cell threshold |
| 4 | OUTPT | | cell output |
| 5 | | TRUE | 0 |
| 6 | | PLUS | 0 |
| 7 | | MINUS | 0 |
| 8 | | TIMES | 0 |

The table above shows how this expression language is syntactically safe. Each token (code for an opcode or operand) is interpreted according to syntax. For example, the expression 0,6,2 is interpreted as INPUT PLUS STATE, which returns the sum of the cell's current state and input. If this were to mutate to 0,4,2 it would be interpreted as INPUT OUTPUT STATE, which would simply return STATE (the operands would overwrite each other in the return buffer). If it mutated to 0,6,5 it would be interpreted as INPUT PLUS 0, because the third value is interpreted in the light of PLUS to be a second operand, and all the table entries whose indices equate to opcodes return 0. The result would therefore be INPUT. In each case, the mutant form is not necessarily useful to the neurone's function, but it is expressible and cannot crash the system. It is also sufficiently un-brittle to make beneficial mutations plausible.

The independence and autonomy of objects in a simulation of the described type, combined with the above system for dynamically inserting and defining new objects, provides for novel approaches to multi-user simulations across networks such as the Internet. One scheme supported by the design of the system is a "mediated peer-to-peer" method of machine-machine communication. In this method, a very large virtual world is divided into discrete, tessellated, smaller regions (encapsulated as cells). Each client computer taking part in the simulation contains an instance of one of these regions (the one containing the user's "camera position" or "virtual persona"). Several users occupying the same region each have a copy of that region and its constituent objects (including each others' personas) loaded in their machine. If an object moves across the boundary between two regions, it contacts a central server computer, which identifies the users of the system whose client machines contain an instance of that new region, and determines the network addresses of those machines. The arriving object is then replicated on each relevant client machine and, thereafter, synchronisation of the instances of that object are handled by peer-to-peer transactions between the affected machines. Thus the server is only acting in a supervisory role, providing "introductions" between machines as objects and users move from region to region. Most of the time, a relatively small number of users are communicating peer-to-peer in a localised experience; many of these experiences are occurring simultaneously across the network, but they only need co-ordinating when an object crosses a region boundary. This system therefore provides for large-scale multi-user simulations and games without incurring serious bandwidth botlenecks at the server.

An example of the system's use: construction of a "Virtual insect"

This example shows the steps in creating a jointed, multi-cellular "insect", capable of limited sensing and locomotion.

1. Select from the cell library or define suitable new cell types for constructing a jointed creature's body and limbs. Limb parts have a rotational joint socket at one end and an equivalent plug at the other. "Feet" have point-of-contact plugs which allow them to interact with the environmental surface, for locomotion. Designing a cell involves selecting suitable plug and socket types and attaching them to the surface of a cell (visually), then programming the state functions of those sockets and plugs to define their functionality. Such cell definition may be done by deriving a class in C++ and compiling it into the cell library, or by defining behaviour at run-time using macro scripts.
2. Apply polygon meshes made from appropriate materials in order to render these cells visible.
3. Connect the cells together by manipulating them in 3D using the built-in tools, to form the creature's body parts (or define their structure and relationships by constructing a genome).
4. Enclose the whole body in a bounding cell (a cell which enables the whole creature to be treated as a single unit).
5. For the head and other sensitive structures, add sensory cells to represent eyes, ears, etc.
6. Attach nerve cells to the sensory structures, to each other and to the "motor neurone" sockets on jointed limb cells to construct a simple, insect like neural network. The network could be wired so that an object seen to move from the right visual field to the left would trigger a rotating sequence of movements in the legs, enabling the insect to track motion, for example. Far more complex, cognitive networks could be constructed for more intelligent creatures. These cells might be rendered in 3D during construction only, as they needn't be visible in the finished object.
7. The bounding cell might be given a chemical reaction network to simulate diffuse changes which selectively (through chemo-receptor sockets) affect or are affected by the neurones. For example, neurones controlling muscles might "use up" an energy chemical, which is provided by a reaction simulating digestion of a food chemical, which in turn is ingested at the mouth through a receptor socket.
8. Before this insect can move, it has to have an environment to move in, which would be provided by an "environment" cell, containing the creature (and food or other types of cell). The 3D mesh would dictate the surface on which the creature moved.
9. "Physics" functions in the bounding cell (hard-coded or scripted) would track the movement of point-of-contact plugs on the insect's feet and compute a suitable translation and rotation vector for the whole creature, perhaps including inertia and friction.

Neurone Learning Feedback

Most neural networks have a "multiplier" value on each of their inputs which gets modulated to make the network learn. This simple approach is limited. For example, if the neural network causes a simulated creature to take a course of action and then some moments later a reinforcement signal comes in (e.g. pain), then the neural network responds by adjusting the weights on certain inputs to change the likelihood of the recent action(s) occurring in similar situations in the future. However, there is no guarantee that the pain is actually the result of the that action(s) and so a strong response would lead the system to jump to conclusions.

On the other hand, a gentler response would even out the learning and base it on a more statistical experience of such action-reinforcement cycles. However, this approach also has problems such as although a creature has been punished for putting his hand in a fire, there have not been enough changes in the creature's sensory environment to override the pressure that made him choose to do that action in the first place. The learning is only weak (in order to made it statistical) and so the incentive to leave the hand in the fire or put it in the fire again is still strong. This is not realistic or valuable behaviour.

In order to deal with this the process cells may be made to have two feedback mechanisms. The weighting value at a neurone has a rest value. Reinforcement signals from an action perturb the weighting value from the rest value by a large amount so that the initial learning is strong. The weighting value then relaxes (e.g. exponentially) back to the rest value in accordance with a first, relatively fast time constant i.e, the neurone forgets the experience. Meanwhile, the rest value relaxes at a much slower rate towards the currently displaced weighting value such that by the time the weighting value has relaxed back to the rest value, then the rest value has moved slightly in the direction of the initial perturbation. The net result is that the neural network reacts rapidly and strongly in the short term, but in the long term builds up a more accurate statistical interpretation of the relationship between action and reinforcement. An example of such an action-reinforcement cycle is given below.

|                 | TIME |     |    |    |    |   |   |   |   |
|-----------------|------|-----|----|----|----|---|---|---|---|
|                 | 0    | 1   | 2  | 3  | 4  | 5 | 6 | 7 | 8 |
| Weighting Value | 0    | 100 | 50 | 25 | 12 | 6 | 3 | 3 | 3 |
| Rest Value      | 0    | 0   | 1  | 1  | 2  | 2 | 3 | 3 | 3 |

It will be appreciated that a data storage medium bearing a program for controlling a general purpose computer to operate in accordance with the above mentioned broad aspects of the invention could be provided as one way of implementing the invention.

What is claimed is:

1. In a computer implemented autonomous-object modeling system comprising:

a plurality of process cells, each process cell including at least one data input, at least one state variable, programmable logic for updating said at least one state variable in dependence upon said at least one data input, at least one data output for outputting data dependent upon said at least one state variable and a programmable link for each said data input specifying a source from which said at least one data input receives data, said plurality of process cells together forming a model of an autonomous object, at least one data input to at least one process cell modeling a stimulus applied to said autonomous object and at least one data output from at least one process cell modeling a response of said autonomous object to stimulation; and a scheduler for triggering said plurality of process cells as a whole to update their state variables whereby each of said plurality of process cells autonomously updates each process cell state variable in dependence upon said at least one data input to each cell using programmable logic to generate said at least one data output, updating of said state variables of said plurality of process cells corresponding to advancing said model of said autonomous-object in time to model behavior of said autonomous-object, wherein at least one of said plurality of process cells comprises a parent process cell that contains at least one child process cell, said at least one child process cell having at least one of a data input connected to a data input of said parent process cell and a data output of said child process cell connected to a data output of said parent process cell such that modeling provided by said parent process cell is at least partially performed by said child process cell.

2. The system as claimed in claim 1, wherein one or more of said process cells are mutable process cells that, during operation, mutate so as to change one or more of said at least one data input, said at a least one state variable, said programmable logic, said at least one data output and said programmable link.

3. The system as claimed in claim 2, wherein said mutable process cells include programmable logic controlled by a sequence of program instruction words of an instruction set, said instruction set having opcode words identifying operations to be performed and operand words identifying variables to be manipulated in said operations, each opcode word having a default value if parsing of said sequence of program instruction words requires that said opcode word is interpreted as an operand word and each operand word having a default action if parsing of said sequence of program instruction words does not specify an opcode word using said operand word, whereby mutation of said sequence of program instruction words does not render said programmable logic inoperative.

4. The system as claimed in claim 3, wherein said opcode words and said operand words have equal length.

5. The system as claimed in claim 3, wherein said operand words specify variables dependent upon data received at said at least one data inputs.

6. The system as claimed in claim 3, wherein said default value for an opcode word is zero.

7. The system as claimed in claim 3, wherein said default action for an operand word is to store said operand word in an accumulator.

8. The system as claimed in claim 1, wherein said source for each said data input is one of a data output of a process cell and an extra-cellular state variable shared by a plurality of process cells.

9. The system as claimed in claim 8, wherein said extra-cellular state variables provide a feedback mechanism for controlling process cell behavior.

10. The system as claimed in claim 1, wherein said programmable logic comprises one of compiled program instruction words, interpreted program instruction words and a program call to a routine defined outside of a process cell.

11. The system as claimed in claim 1, wherein said process control apparatus operates to provide a simulation of a physical system, at least some of said process cells corresponding to elements of said physical system, means for expressing said simulation serving so that it may be perceived by a user.

12. The system as claimed in claim 1, wherein said process control apparatus operates as a neural network, at least some of said process cells serving as neurons within said neural network, and comprising means receiving outputs of said neural network serving to perform further operations in dependence thereupon.

13. The system as claimed in claim 1, wherein within a process cell said programmable logic multiplies data received at a data input by a weighting coefficient having a rest value, said weighting coefficient being modulated by modulating data received at other data inputs of said process cell to provide a fast feedback mechanism whereby said weighting coefficient is changed by said modulating data and then relaxes towards said rest value in accordance with a first time constant and a slow feedback mechanism whereby said rest value relaxes towards said weighting coefficient in accordance with a second time constant, said second time constant being greater than said first time constant.

14. The system as claimed in claim 1 operating to simulate a tessellated virtual environment using a plurality of client computers and a server computer, wherein each client computer contains those process cells relevant to a region currently being simulated by said client computer and client computers within a region interacting via peer-to peer communication, said server serving to pass identification data to and maintain in those client computers, said identification data serving to identify the client computers within said environment to enable peer-to-peer communication therebetween as client computers move between different regions of said tessellated virtual environment.

15. A computer implemented autonomous-object modeling method for controlling a plurality of process cells, each process cell including at least one data input, at least one state variable, programmable logic for updating said at least one state variable in dependence upon said at least one data input, at least one data output for outputting data dependent upon said at least one state variable and a programmable link for each said data input specifying a source from which said at least one data input receives data, said plurality of process cells together forming a model of an autonomous object, at least one data input to at least one process cell modeling a stimulus applied to said autonomous object and at least one data output from at least one process cell modeling a response of said autonomous object to stimulation, said method comprising the step of:

triggering said plurality of process cells as a whole to update their state variables whereby each of said plurality of process cells autonomously updates each process cell state variable in dependence upon said at least one data input to each cell using programmable logic to generate said at least one data output, updating of said state variables of said plurality of process cells corresponding to advancing said model of said autonomous-object in time to model behavior of said autonomous-object, wherein at least one of said plurality of process cells comprises a parent process cell that contains at least one child process cell, said at least one child process cell having at least one of a data input connected to a data input of said parent process cell and a data output of said child process cell connected to a data output of said parent process cell such that modeling provided by said parent process cell is at least partially performed by said child process cell.

16. A computer program product for controlling a computer to provide an autonomous-object modeling method for controlling a plurality of process cells, each process cell including at least one data input, at least one state variable, programmable logic for updating said at least one state variable in dependence upon said at least one data input, at least one data output for outputting data dependent upon said at least one state variable and a programmable link for each said data input specifying a source from which said at least one data input receives data, said plurality of process cells together forming a model of an autonomous object, at least one data input to at least one process cell modeling a stimulus applied to said autonomous object and at least one data output from at least one process cell modeling a response of said autonomous object to stimulation, said method comprising the step of:

triggering said plurality of process cells as a whole to update their state variables whereby each of said plurality of process cells autonomously updates each process cell state variable in dependence upon said at least one data input to each cell using programmable logic to generate said at least one data output, updating of said state variables of said plurality of process cells corresponding to advancing said model of said autonomous-object in time to model behavior of said autonomous-object, wherein at least one of said plurality of process cells comprises a parent process cell that contains at least one child process cell, said at least one child process cell having at least one of a data input connected to a data input of said parent process cell and a data output of said child process cell connected to a data output of said parent process cell such that modeling provided by said parent process cell is at least partially performed by said child process cell.

* * * * *